(12) United States Patent
Soeno et al.

(10) Patent No.: US 7,864,469 B2
(45) Date of Patent: Jan. 4, 2011

(54) INFORMATION RECORDING MEDIUM, RECORDING/REPRODUCING APPARATUS, AND STAMPER

(75) Inventors: Yoshikazu Soeno, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 218 days.

(21) Appl. No.: 12/342,860

(22) Filed: Dec. 23, 2008

(65) Prior Publication Data
US 2009/0168245 A1   Jul. 2, 2009

(30) Foreign Application Priority Data
Dec. 28, 2007   (JP) .............................. 2007-338977

(51) Int. Cl.
*G11B 5/09* (2006.01)
(52) U.S. Cl. ..................... 360/48; 360/77.08; 360/135
(58) Field of Classification Search ................... None
See application file for complete search history.

(56) References Cited

U.S. PATENT DOCUMENTS

| | | | |
|---|---|---|---|
| 4,016,603 A | 4/1977 | Ottesen |
| 6,014,296 A | 1/2000 | Ichihara et al. |
| 6,139,936 A | 10/2000 | Weiss |
| 6,154,330 A | 11/2000 | Nakagawa |
| 6,324,032 B1 | 11/2001 | Ohtsuka et al. |
| 6,421,195 B1 | 7/2002 | Rubin et al. |
| 6,563,673 B2 | 5/2003 | Mundt et al. |
| 7,193,796 B2 | 3/2007 | Yasunaga |
| 7,296,514 B2 | 11/2007 | Fujita et al. |
| 7,362,528 B2 | 4/2008 | Moriya et al. |
| 7,403,355 B2 | 7/2008 | Soeno et al. |
| 2005/0233176 A1 | 10/2005 | Takai et al. |
| 2006/0044687 A1 | 3/2006 | Soeno et al. |
| 2006/0066975 A1 | 3/2006 | Soeno et al. |
| 2006/0077880 A1 | 4/2006 | Moriya et al. |

FOREIGN PATENT DOCUMENTS

JP            3-130968 A         6/1991

(Continued)

OTHER PUBLICATIONS

English language Abstract of JP 9-097419 A.

(Continued)

*Primary Examiner*—Daniell L Negrón
*Assistant Examiner*—Regina N Holder
(74) *Attorney, Agent, or Firm*—Greenblum & Bernstein P.L.C.

(57) ABSTRACT

Data track patterns and servo patterns are formed on an information recording medium by concave/convex patterns divided into ring-shaped regions that are concentric with the data track patterns. In the servo patterns, a unit convex length and a unit concave length along the direction of rotation increase in each ring-shaped region from an inside to an outside of the ring-shaped region in proportion to the distance from the center of the data track patterns and a value produced by dividing an average unit convex (or concave) length inside each ring-shaped region by a distance from the center to the ring-shaped region decreases toward the outer periphery of the medium. The ring-shaped regions include plural first regions between an innermost region and an outermost region. Respective lengths along a radial direction of the first regions increase toward an outer periphery of the medium.

12 Claims, 12 Drawing Sheets

FOREIGN PATENT DOCUMENTS

| | | |
|---|---|---|
| JP | 7-220404 A | 8/1995 |
| JP | 9-097419 A | 4/1997 |
| JP | 2000-020945 A | 1/2000 |
| JP | 2000-222725 A | 8/2000 |
| JP | 2002-359138 A | 12/2002 |
| JP | 2003-178431 A | 6/2003 |
| JP | 2003-228927 A | 8/2003 |
| JP | 2004-171658 A | 6/2004 |
| JP | 2004-342226 A | 12/2004 |
| JP | 2006-120299 A | 5/2006 |
| JP | 2006-318581 A | 11/2006 |

OTHER PUBLICATIONS

English language Abstract of JP 3-130968 A.
English language Abstract of JP 2006-120299 A.
English language Abstract of JP 2000-020945 A.
English language Abstract of JP 2006-318581 A.
English language Abstract of JP 2003-228927 A.
English language Abstract of JP 2002-359138 A.
English language Abstract of JP 2003-178431 A.
English language Abstract of JP 2004-171658 A.
English language Abstract of JP 2000-222725 A.
English language Abstract of JP 2004-342226 A.
English language Abstract of JP 7-220404 A.

F I G. 1 7

| | DISTANCE a (mm) | | LENGTH b (mm) | LENGTH RATIO c | UNIT CONVEX LENGTH (nm) | | | UNIT CONCAVE LENGTH (nm) | | | VALUE d | FREQUENCY e (MHz) |
|---|---|---|---|---|---|---|---|---|---|---|---|---|
| | INNERMOST PERIPHERY | OUTERMOST PERIPHERY | | | INNERMOST PERIPHERY | OUTERMOST PERIPHERY | AVERAGE LENGTH | INNERMOST PERIPHERY | OUTERMOST PERIPHERY | AVERAGE LENGTH | | |
| RING-SHAPED REGION Az | 10.00 | 10.61 | 0.610 (Lz) | | 56.55 | 60.00 | 58.28 | 56.55 | 60.00 | 58.28 | 5.83 | 33.3 |
| RING-SHAPED REGION A1 | 10.61 | 12.73 | 2.122 (L1) | 1:3.5 | 50.00 | 60.00 | 55.00 | 50.00 | 60.00 | 55.00 | 5.18 | 40.0 |
| RING-SHAPED REGION A2 | 12.73 | 15.28 | 2.546 (L2) | 1:1.2 | 50.00 | 60.00 | 55.00 | 50.00 | 60.00 | 55.00 | 4.32 | 48.0 |
| RING-SHAPED REGION A3 | 15.28 | 18.33 | 3.056 (L3) | 1:1.2 | 50.00 | 60.00 | 55.00 | 50.00 | 60.00 | 55.00 | 3.60 | 57.6 |
| RING-SHAPED REGION A4 | 18.33 | 22.00 | 3.667 (L4) | 1:1.2 | 50.00 | 60.00 | 55.00 | 50.00 | 60.00 | 55.00 | 3.00 | 69.1 |

DISTANCE a : DISTANCE FROM CENTER O OF DATA TRACK PATTERNS
LENGTH b : LENGTH ALONG RADIAL DIRECTION
LENGTH RATIO c: RATIO OF LENGTHS ALONG RADIAL DIRECTION
VALUE d : VALUE PRODUCED BY DIVIDING AVERAGE OF UNIT CONVEX LENGTH AND AVERAGE OF UNIT CONCAVE LENGTH
BY DISTANCE FROM CENTER O OF DATA TRACK PATTERNS
FREQUENCY e : READ FREQUENCY OF SERVO DATA

INFORMATION RECORDING MEDIUM, RECORDING/REPRODUCING APPARATUS, AND STAMPER

BACKGROUND OF THE INVENTION

1. Field of the Invention

The present invention relates to an information recording medium on which data track patterns and servo patterns are formed by concave/convex patterns with plural convexes, at least protruding end portions of which are formed of one out of a recording material and a non-recording material, and concaves that are filled with the other out of the recording material and the non-recording material, a recording/reproducing apparatus equipped with such information recording medium, and a stamper for manufacturing such information recording medium.

2. Description of the Related Art

As one example of a recording/reproducing apparatus equipped with this type of information recording medium, a magnetic recording apparatus equipped with a discrete track-type magnetic disk is disclosed by Japanese Laid-Open Patent Publication No. H09-97419. The magnetic disk provided in this magnetic recording apparatus is produced by forming recording tracks ("belt-shaped convexes"), which are in the form of concentric circles and are composed of a recording magnetic material ("recording material"), on one surface of a glass disk base plate ("substrate"). Guard band parts are also formed by filling spaces ("concaves") between the respective recording tracks with a guard band material ("non-recording material") to make the magnetic disk smoother and to magnetically separate adjacent magnetic recording tracks.

When manufacturing such magnetic disk, first a recording material is sputtered onto one surface of the substrate to form a recording magnetic layer. Next, after a positive-type resist is spin-coated so as to cover the recording magnetic layer and prebaked, the same pattern as the guard band parts is drawn using a matrix cutting apparatus and then developed. By doing so, a resist pattern is formed on the recording magnetic layer. After this, the recording magnetic layer is etched using the resist pattern as a mask, and following the etching process, mask residue is removed by an ashing apparatus. By doing so, recording tracks and servo patterns (convexes) made up of recording material are formed on the substrate. After this, a non-recording material is sputtered onto the substrate in this state to form a layer of the non-recording material. When doing so, a sufficient amount of non-recording material is sputtered until the respective concaves between the recording tracks are completely filled with the non-recording material and the respective recording tracks are covered with the non-recording material. Next, the surface of the layer of the non-recording material is dry-etched to expose the upper surfaces of the recording tracks (the recording material) from the layer of the non-recording material. By doing so, recording tracks and guard band parts become adjacent in an alternating manner, thereby completing the magnetic disk.

However, the present applicant has found a problem in that when a conventional magnetic disk is manufactured according to the method of manufacturing described above, there are cases where in an outer periphery of the magnetic disk, a large amount of non-recording material remains on the convexes formed of the recording material (hereinafter, non-recording material remaining on the convexes is also referred to as "residue"), resulting in the convexes becoming thickly covered with residue. As a specific example, as shown in FIG. 22, a magnetic disk 10x manufactured according to the method of manufacturing described above is manufactured so that data track pattern regions At, in each of which a concave/convex pattern 20t composed of plural recording tracks in the form of concentric circles is formed, and servo pattern regions Asx, in each of which a concave/convex pattern 20sx used for a tracking servo is formed, are set so as to alternate in the direction of rotation of the magnetic disk 10x (the direction of the arrow R in FIG. 22).

A recording/reproducing apparatus in which this type of magnetic disk is provided is normally constructed to rotate the magnetic disk at a fixed angular velocity during recording and reproducing and to carry out reads of servo data in synchronization with a detection clock signal with a fixed frequency from an inner periphery to an outer periphery of the magnetic disk. Accordingly, on the magnetic disk 10x, as shown in FIG. 23, in proportion to the length on the magnetic disk 10x that passes below a magnetic head (not shown) per unit time, the length of each servo pattern region Asx along the direction of rotation of the magnetic disk 10x is set so as to become longer from the inner periphery of the magnetic disk 10x to the outer periphery in proportion to the distance from the center O of the concave/convex patterns 20t (i.e., each servo pattern region Asx widens toward the outer periphery of the magnetic disk 10x).

Also, on the magnetic disk 10x, as shown in FIGS. 24 and 26, at positions an equal distance from the center O, a unit convex length (i.e., a standard length detected as indicating the presence of one convex when a magnetic signal is read: L5xi, L5xo in FIGS. 25 and 27) in the direction of rotation of convexes 21sxi, 21sxo (hereinafter simply referred to as the "convexes 21sx" when no distinction is required) in a servo pattern region Asx (a concave/convex pattern 20sx) is set equal to the unit concave length (i.e., a standard length detected as indicating the presence of one concave when a magnetic signal is read: L6xi, L6xo in FIGS. 25 and 27) along the direction of rotation of concaves 22sxi, 22sxo (hereinafter simply referred to as the "concaves 22sx" when no distinction is required). Accordingly, on the magnetic disk 10x, the ratio of the unit convex length to the unit concave length is 1 across the entire range from the inner periphery to the outer periphery. In addition, on the conventional magnetic disk 10x, the length L5xo of the convexes 21sxo in an outer periphery servo pattern region Asxo is longer than the length L5xi of the convexes 21sxi in an inner periphery servo pattern region Asxi in proportion to the distance from the center O of the concave/convex patterns 20t, and the length L6xo of the concaves 21sxo in the outer periphery servo pattern region Asxo is longer than the length L6xi of the concaves 22sxi in the inner periphery servo pattern region Asxi in proportion to the distance from the center O of the concave/convex patterns 20t.

The present applicant has discovered a phenomenon whereby during the dry-etching of the layer of the non-recording material (the non-magnetic material 15) to expose the respective convexes 21sx, the wider the protruding end surfaces of the convexes 21sx present below the non-magnetic material 15 (for example, the greater the lengths along the direction of rotation and along the radial direction of the magnetic disk 10x of the protruding end surfaces of the convexes 21sx), the slower the etching of the layer of the non-magnetic material 15 will proceed. For this reason, as shown in FIG. 25, when etching is carried out for the entire region of the magnetic disk 10x from the inner periphery to the outer periphery with etching conditions set so that in the inner periphery servo pattern region Asxi where the length L5xi along the direction of rotation of the protruding end surfaces is comparatively short, the residue (the non-magnetic material 15) on the convexes 21sxi is removed to achieve favorable smoothness in the inner periphery of the magnetic disk 10x (i.e., the value of the surface roughness Ra is low, or the height difference Hxi between the concaves and the convexes is small), as shown in FIG. 27, comparatively thick residue (the non-magnetic material 15) will be left on the convexes 21sxo in the outer periphery servo pattern region Asxo where the length L5xo along the direction of rotation of the protruding end surfaces is comparatively long. Accordingly, when the layer of the non-magnetic material 15 is etched with such etching conditions, the surface roughness Ra (or the height difference Hxo between the concaves and convexes) in the outer periphery of the magnetic disk 10x becomes extremely large. In this way, for the conventional magnetic disk 10x, there is the problem that due to the convexes 21sxo being thickly covered with the non-magnetic material 15 in the outer periphery, the smoothness of the magnetic disk 10x deteriorates remarkably in the outer periphery (i.e., as the distance from the center O increases).

On the other hand, when the etching is continued until the non-magnetic material 15 on the convexes 21sxo in the outer periphery servo pattern region Asxo where the length L5xo along the direction of rotation of the protruding end surfaces is comparatively long is removed so that no residue (non-magnetic material 15) is left on the convexes 21sx across the entire magnetic disk 10x, since the non-magnetic material 15 on the convexes 21sxi in the inner periphery servo pattern region Asxi where the length L5xi along the direction of rotation of the protruding end surfaces is comparatively short will be removed in a comparatively short time, the non-magnetic material 15 inside the concaves 22sxi that are formed in the inner periphery servo pattern region Asxi in the vicinity of the convexes 21sxi will also be removed, and in the worst case scenario, not only the non-magnetic material 15 but also the convexes 21sxi (the recording material) will be excessively etched. This means that when the non-magnetic material 15 is etched with the etching conditions described above, due to the non-magnetic material 15 being removed inside the concaves 22sxi in the inner periphery of the magnetic disk 10x, the surface roughness Ra (i.e., the difference in height between the concaves and convexes) will become extremely large, resulting in the problems of a remarkable deterioration in the smoothness of the magnetic disk 10x in the inner periphery (i.e., as the distance from the center O decreases) and difficulty in properly reading the servo data (which occurs when the convexes 21sxi (recording material) are excessively etched).

The present applicant has also developed a magnetic disk where concaves in a concave/convex pattern formed of non-recording material (non-magnetic material) are filled with recording material (magnetic material). In such case, the present applicant has discovered a phenomenon whereby during the manufacturing of a magnetic disk of this type, as one example, even when a layer of recording material is formed so as to cover a concave/convex pattern formed of a non-recording material such as glass (for example, a concave/convex pattern formed in a glass base plate: not shown) and the convexes are exposed by dry etching the layer of recording material, the wider the protruding end surfaces of the convexes (non-recording material) present below the layer of recording material (the greater the lengths along the direction of rotation and the radial direction of the magnetic disk of the protruding end surfaces of the convexes), the slower the etching of the recording material will proceed.

Accordingly, on a magnetic disk (not shown) where concaves in a concave/convex pattern formed of non-recording material are filled with recording material, when the entire range from the inner periphery to the outer periphery of the magnetic disk is etched with etching conditions set so that the recording material on the convexes is removed in an inner-periphery servo pattern region where the length along the direction of rotation of the protruding end surfaces of the convexes is comparatively short to achieve favorable smoothness in the inner periphery of the magnetic disk, in an outer-periphery servo pattern region where the length along the direction of rotation of the protruding end surfaces of the convexes is comparatively long, the convexes will be thickly covered with recording material (hereinafter, recording material remaining on the convexes is also referred to as "residue") and due to this there is the problem of remarkable deterioration in smoothness of the magnetic disk in the outer periphery (as the distance from the center O increases). On the other hand, when the etching is continued until the recording material on the convexes is removed in an outer-periphery servo pattern region where the length along the direction of rotation of the protruding end surfaces of the convexes is comparatively long, in an inner-periphery servo pattern region where the length along the direction of rotation of the protruding end surfaces of the convexes is comparatively short (as the distance from the center O decreases), the convexes (the non-recording material) will be etched, resulting in the problem of remarkable deterioration in the smoothness of the magnetic disk.

To solve this problem, the present applicant has developed a magnetic disk where the concave/convex patterns that construct the servo patterns are divided into plural ring-shaped regions that are concentric with the data track patterns and where the servo patterns (i.e., the concave/convex patterns that construct the servo patterns) are formed by setting a unit convex length in each ring-shaped region so that a value produced by dividing the average unit convex length in each ring-shaped region by the distance from the center of the data track patterns to the ring-shaped region falls from an inner-periphery ring-shaped region to an outer-periphery ring-shaped region (see Japanese Laid-Open Patent Publication No. 2006-120299). According to this magnetic disk developed by the present applicant, compared to the magnetic disk 10x described above where the concave/convex patterns are formed so that the unit convex length gradually increases from the inner periphery toward the outer periphery of the magnetic disk in proportion to the distance from the center, it is possible to sufficiently reduce the unit convex length in an outer-periphery ring-shaped region.

Accordingly, with the magnetic disk developed by the present applicant, during manufacturing, when the entire range from the inner periphery to the outer periphery of the magnetic disk is etched with etching conditions set so that the residue (non-recording material) on the convexes in an inner-periphery servo pattern region where the length along the direction of rotation of the unit convex length is comparatively short is removed to achieve favorable smoothness in the inner periphery of the magnetic disk, it is possible to avoid a situation where there is a large difference between the thickness of the residue on the convexes in an outer-periphery ring-shaped region and the thickness of the residue on the convexes in an inner-periphery ring-shaped region (that is, a large difference between the thickness of the residue on the convexes in the inner periphery of the information recording medium and the thickness of the residue on the convexes in the outer periphery of the information recording medium). Also, on the magnetic disk developed by the present applicant, during manufacturing, even when the etching is continued until the non-recording material on the convexes is removed in an outer-periphery servo pattern region where the length along the direction of rotation of the unit convex length is comparatively long, it will be possible to remove the residue on the respective convexes without excessively etching the convexes together with the non-recording material in an inner-periphery ring-shaped region. As a result, it is possible to maintain favorable smoothness across the entire range of the information recording medium.

SUMMARY OF THE INVENTION

However, the magnetic disk developed by the present applicant has the following aspect to be improved. That is, the magnetic disk developed by the present applicant uses a construction where the concave/convex patterns that construct the servo patterns are divided into plural ring-shaped regions and the unit convex length in an outer-periphery ring-shaped region is reduced by setting the unit convex length in each ring-shaped region so that a value produced by dividing the average unit convex length in each ring-shaped region by the distance from the center to the ring-shaped region falls in each ring-shaped region toward the outside. In this case, on the magnetic disk developed by the present applicant, as one example, the length along the radial direction of each ring-shaped region is set so as to be equal.

Accordingly, on the magnetic disk developed by the present applicant, when a construction is used where the unit convex length and unit concave length increase in each ring-shaped region in proportion to the distance from the center of the data track patterns so that servo data can be read without changing the frequency of the detection clock signal within one ring-shaped region (i.e., a construction where the unit convex length and the unit concave length increase in each ring-shaped region toward the outer periphery of the ring-shaped region), one of a situation where there is an increase in the difference between the unit convex length and the unit concave length on the innermost periphery of an inner-periphery ring-shaped region and the unit convex length and the unit concave length in the outermost periphery of each ring-shaped region (i.e., a situation where the unit convex length and the unit concave length on the inner periphery side of the inner-periphery ring-shaped region are short), and a situation where there is an increase in the difference between the innermost unit convex length and innermost unit concave length of each ring-shaped region and the outermost unit convex length and outermost unit concave length of the inner-periphery ring-shaped region (i.e., a situation where the unit convex length and unit concave length on the outer periphery side of the inner-periphery ring-shaped region are long) will occur.

More specifically, on a magnetic disk 10*ax* shown in FIG. 28, in the same way as the magnetic disk described above that was developed by the present applicant, concave/convex patterns 20*sax* that construct servo patterns (i.e., servo pattern regions Asax) and concave/convex patterns 20*t* that construct the data track patterns (i.e., the data track pattern regions At) are formed so as to be divided into four ring-shaped regions A1*x* to A4*x* (hereinafter such regions are referred to as the "ring-shaped regions Ax" when no distinction is required). In this case, on the magnetic disk 10*ax* where the lengths Lx in the radial direction of the respective ring-shaped regions Ax are equal, when a construction is used where the unit convex length and the unit concave length increase in each ring-shaped region Ax in proportion to the distance from the center O of the data track pattern regions At (the concave/convex patterns 20*t*) (i.e., a construction where the unit convex length and the unit concave length increase toward the outer periphery of each ring-shaped region Ax) and the outermost unit convex length and outermost unit concave length in each ring-shaped region Ax are set equal, the innermost unit convex length and the innermost unit concave length in each ring-shaped region Ax will become shorter in ring-shaped regions Ax toward the inner periphery of the magnetic disk 10*ax*. Accordingly, on the magnetic disk 10*ax*, there is an increase in the difference between (i) the longest unit convex length and the unit concave length in the entire range from the ring-shaped region A1*x* in the innermost periphery to the ring-shaped region A4*x* in the outermost periphery (in this example, the outermost unit convex length and the outermost unit concave length in each ring-shaped region Ax) and (ii) the shortest unit convex length and the unit concave length in the entire range (in this example, the innermost unit convex length and the innermost unit concave length in the ring-shaped region A1*x*).

On the other hand, on a magnetic disk 10*bx* shown in FIG. 29, in the same way as the magnetic disk described above developed by the present applicant and the magnetic disk 10*ax* described above, concave/convex patterns 20*sbx* that construct the servo patterns (i.e., servo patterns Asbx) and concave/convex patterns 20*t* that construct the data track patterns (i.e., the data track pattern regions At) are formed so as to be divided into four ring-shaped regions A1*x* to A4*x*. In this case, on the magnetic disk 10*bx* where the lengths Lx in the radial direction of the respective ring-shaped regions Ax are equal, when a construction is used where the unit convex length and the unit concave length increase in each ring-shaped region Ax in proportion to the distance from the center O of the data track pattern regions At (the concave/convex patterns 20*t*) (i.e., a construction where the unit convex length and the unit concave length increase toward the outer periphery side of each ring-shaped region Ax) and the innermost unit convex length and the innermost unit concave length in each ring-shaped region Ax are set equal, the outermost unit convex length and the outermost unit concave length in each ring-shaped region Ax will become longer in ring-shaped regions Ax toward the inner periphery of the magnetic disk 10*ax*. Accordingly, on the magnetic disk 10*bx*, there is an increase in the difference between (i) the shortest unit convex length and unit concave length in the entire range from the ring-shaped region A1*x* in the innermost periphery to the ring-shaped region A4*x* in the outermost periphery (in this example, the innermost unit convex length and the innermost unit concave length in each ring-shaped region Ax) and (ii) the longest unit convex length and unit concave length in the entire range (in this example, the outermost unit convex length and outermost unit concave length in the ring-shaped region A1*x*).

In this case, if there is a large difference between the longest unit convex length and the shortest unit convex length across the entire disk as on the magnetic disks 10*ax*, 10*bx* described above, when, during manufacturing of the magnetic disk, the entire range from the inner periphery to the outer periphery of the magnetic disk is etched with etching conditions set so that the residue (non-recording material) on the convexes in the region with the shortest unit convex length (i.e., the inner periphery side of the ring-shaped region A1 on the magnetic disk 10*ax* or the inner periphery side of each ring-shaped region Ax on the magnetic disk 10*bx*) is removed to achieve favorable smoothness in the region with the shortest unit convex length, in the region with the longest unit convex length (i.e., the outer periphery side of each ring-shaped region Ax on the magnetic disk 10*ax* or the outer periphery side of the ring-shaped region A1*x* on the magnetic disk 10*bx*), the convexes will be thickly covered with non-recording material, resulting in the risk of deterioration in the smoothness of the magnetic disk. Also, when the etching is continued until non-recording material on the convexes is removed in the region with the longest unit convex length, due to the non-recording material inside the concaves being etched and/or the convexes (recording regions) being excessively etched together with the non-recording material in the region with the shortest unit convex length, there is the risk of remarkable deterioration in the smoothness of the magnetic disk in such region, which can lead to difficulty in properly reading the servo data.

In this case, when manufacturing the magnetic disk, by using a method of manufacturing that forms a layer of non-recording material with sufficient thickness on the concave/convex pattern and exposes the convexes by etching such layer of non-recording material, there is the possibility that the etching will proceed at approximately the same speed at both positions where the protruding end surfaces of the convexes below the non-recording material are wide (i.e., positions where the length along the direction of rotation and the length of the radial direction of the protruding end surfaces of the convexes are long) and positions where the protruding end surfaces of the convexes below the non-recording material are narrow (i.e., positions where one of the length along the direction of rotation and the length of the radial direction of the protruding end surfaces of the convexes is short). Accordingly, by using such method of manufacturing, it may be possible to avoid a situation where thick non-recording material remains on the convexes in a region where the unit convex length is long and a situation where the non-recording material inside the concaves is etched and/or where the convexes are excessively etched in a region where the unit convex length is short. However, when this method of manufacturing is used, a long time is required to form the thick layer of non-recording material and a long time is also required to etch the thick layer of non-recording material, resulting in the risk of a rise in the manufacturing cost of a magnetic disk. There is also the risk that the manufacturing cost of a magnetic disk will increase due to the increase in the amount of non-recording material that needs to be removed by etching.

If, like the magnetic disks 10ax, 10bx described above, the difference between the longest unit concave length and the shortest unit concave length across an entire magnetic disk is large and the magnetic disk is manufactured by forming the concave/convex patterns used as servo patterns and the concave/convex patterns used as data track patterns by carrying out imprinting to form a mask pattern for use during etching, there is the risk that it will be difficult to uniformly press the convexes formed on a stamper into the entire range of the resin material used to form the mask pattern, resulting in the risk of difficulty in forming concaves with the desired open lengths in the layer of resin material. More specifically, in the data track pattern regions At and servo pattern regions Asax, Asbx on the magnetic disks 10ax, 10bx described above, various types of concaves are formed, such as concaves with narrow open surfaces (i.e., concaves where one of the open length along the direction of rotation of the magnetic disks 10ax, 10bx and the open length along the radial direction of the magnetic disks 10ax, 10bx is narrow) and concaves with wide open surfaces (i.e., concaves where both of the open length along the direction of rotation of the magnetic disks 10ax, 10bx and the open length along the radial direction of the magnetic disks 10ax, 10bx is wide).

On a stamper used for imprinting when manufacturing the magnetic disks 10ax, 10bx, in regions corresponding to regions on the magnetic disks 10ax, 10bx where the unit concave length is short (i.e., regions where the open surfaces of the concaves are narrow), the convexes become shorter corresponding to the open length of the concaves to be formed (i.e., the protruding end surfaces of the convexes become narrow). On the other hand, in regions corresponding to regions on the magnetic disks 10ax, 10bx where the unit concave length is long (i.e., regions where the open surfaces of the concaves are wide), the convexes become longer corresponding to the open length of the concaves to be formed (i.e., the protruding end surfaces of the convexes become wide). Accordingly, there is the risk that when such stamper is pressed onto the layer of resin material with a uniform pressing force across the entire stamper during imprinting, although it will be possible to press the convexes with narrow protruding end surfaces on the stamper (in this example, the convexes where the length along the direction of rotation of the protruding end surfaces is short) sufficiently deeply into the layer of resin material, it will be difficult to press the convexes with wide protruding end surfaces (in this example, the convexes where the length along the direction of rotation of the protruding end surfaces is long) sufficiently deeply into the layer of resin material, resulting in the risk of thick residue (resin material) being produced at the positions where the long convexes are pressed in.

In this case, when concave/convex patterns are formed on a magnetic disk by etching using a mask pattern (i.e., a layer of resin material) formed by pressing in concave/convex patterns of a stamper, it is necessary to remove the residue on the base surfaces of the concaves in the mask pattern (i.e., the concave/convex patterns formed in the layer of resin material). Accordingly, when a mask pattern is formed by imprinting using the type of stamper described above, due to the residue being thick in regions where the convexes could not be sufficiently pressed in (i.e., regions where the convexes with wide protruding end surfaces (i.e., convexes where the length along the direction of rotation of the protruding end surfaces is long) are pressed in: regions where concaves with wide open surfaces (i.e., concaves where the length along the direction of rotation of the open surface is long) are to be formed), a long time is required to remove the thick residue. Also, when the etching is continued for a long time to remove such thick residue, in regions where the residue is thin (i.e., regions where the convexes with narrow protruding end surfaces (i.e., convexes where the length along the direction of rotation of the protruding end surfaces is short) are pressed in: regions where concaves with narrow open surfaces (i.e., concaves where the length along the direction of rotation of the open surfaces is narrow) are to be formed), due to the etching continuing after the residue is completely removed, the inner wall surfaces of the concaves will become corroded, resulting in an increase in the length in the direction of rotation and the length in the radial direction (open length) of the concaves.

For this reason, when manufacturing a magnetic disk where the difference between the longest unit concave length and the shortest unit concave length is large by imprinting, there is the risk that it will be difficult to achieve the desired open lengths for concaves in the mask pattern in regions where the shortest unit convex length is set. Accordingly, if a magnetic disk where the difference between the longest unit concave length and the shortest unit concave length is large is manufactured using a mask pattern with concaves whose open length differs to the desired open length, the open lengths of concaves in the concave/convex patterns used as servo patterns will differ to the desired open lengths. Due to this, there is the risk that it will be difficult to properly read the servo data.

In addition, when the difference between the longest unit concave length and the shortest unit concave length across the entire disk is large as on the magnetic disks 10ax, 10bx described above and concave/convex patterns are formed on a preform for a magnetic disk by etching using a mask pattern formed as described above, there is the risk that in regions where the unit concave length is long (i.e., regions where concaves with wide open surfaces are to be formed), the preform will be etched more deeply than in regions where the unit concave length is short (i.e., regions where concaves with narrow open surfaces are to be formed). Accordingly, due to concave/convex patterns with concaves whose depths increase as the width of the open surfaces increases being formed on the preform, there is the risk of deterioration in the smoothness of the magnetic disk. In this way, there is the risk that it will be difficult to achieve favorable smoothness across the entire range of a magnetic disk where the difference between the longest unit convex length and the shortest unit convex length is large and a magnetic disk where the difference between the longest unit concave length and the shortest unit concave length is large. Such aspect needs to be improved.

Note that by using the same construction as the magnetic disks 10ax, 10bx and increasing the number of ring-shaped regions Ax (i.e., the number of divisions) to sufficiently reduce the length in the radial direction of the respective ring-shaped regions Ax, it would be possible to reduce the difference between the longest unit convex length and the shortest unit convex length across the entire disk and/or reduce the difference between the longest unit concave length and the shortest unit concave length across the entire disk. However, if such construction were used, the number of frequencies of detection clock signals would need to increase in keeping with the number of ring-shaped regions Ax, which would make tracking servo control difficult.

The present invention was conceived in view of the problems described above and it is a principal object of the present invention to provide an information recording medium that has favorable smoothness in an entire range from an inner periphery to an outer periphery thereof and enables servo data to be read properly, a recording/reproducing apparatus equipped with an information recording medium that has favorable smoothness and enables servo data to be read properly, and a stamper that is capable of manufacturing an information recording medium that has favorable smoothness and enables servo data to be read properly.

To achieve the stated object, an information recording medium according to the present invention has data track patterns and servo patterns formed on at least one surface of a substrate by concave/convex patterns with plural convexes, at least protruding end parts of which are formed of one of a recording material and a non-recording material, and concaves, which are filled with another of the recording material and the non-recording material, wherein the concave/convex patterns that construct the data track patterns are formed so that the convexes and the concaves are disposed in one of concentric circles and a spiral, the concave/convex patterns that construct the data track patterns and the servo patterns are divided into plural ring-shaped regions that are concentric with the data track patterns, in the concave/convex patterns that construct the servo patterns, unit convex lengths and unit concave lengths are set in each ring-shaped region so that a unit convex length along a direction of rotation of the substrate and a unit concave length along the direction of rotation become longer in each ring-shaped region from an inner periphery of the ring-shaped region to an outer periphery of the ring-shaped region in proportion to a distance from a center of the data track patterns and so that a value produced by dividing an average of the unit convex length inside each ring-shaped region by a distance from the center of the data track patterns to the ring-shaped region and a value produced by dividing an average of the unit concave length inside each ring-shaped region by a distance from the center of the data track patterns to the ring-shaped region decrease from an inner-periphery ring-shaped region to an outer-periphery ring-shaped region, the plural ring-shaped regions are composed of an innermost ring-shaped region, an outermost ring-shaped region, and plural first ring-shaped regions between the innermost ring-shaped region and the outermost ring-shaped region, and respective lengths along a radial direction of the substrate of the first ring-shaped regions are set so as to increase from an inner-periphery first ring-shaped region toward an outer-periphery first ring-shaped region.

Note that the expression "recording material" in the present specification refers to material that is capable of constructing a region that can hold a recorded magnetic signal in a readable manner (that is, a material with the ability to hold a magnetic signal in a readable manner). In this case, the concept of "recording material for constructing recording regions" refers to the material for constructing recording regions, that is, the main material that constructs recording regions (the material that mainly contributes to the recording regions having the ability described above). Also, the expression "non-recording material" in the present specification refers to a material that is constructed so that an ability thereof to hold a magnetic signal in a readable manner is lower than that of the recording region, or a material constructed so as not to effectively have such ability. More specifically, the expression "non-recording material" in the present specification refers to a material such that in a state where a magnetic signal is recorded on regions constructed of such material, a smaller magnetic field will be emitted compared to regions constructed of the recording material described above, or a material for constructing regions that effectively do not emit a magnetic field. In this case, the concept of "non-recording material for constructing non-recording regions" refers to the material for constructing non-recording regions, that is, the main material that constructs non-recording regions (the material that mainly contributes to the ability described above of the non-recording regions being in the desired state).

Also, the concept of "data track patterns in which the convexes are disposed in one of concentric circles and a spiral" in the present specification includes data track patterns of a patterned medium where convexes (at least protruding end parts of which are formed of recording material) are disposed in concentric circles or a spiral as recording elements that are separated in both the radial direction and the direction of rotation of the information recording medium by concaves in the concave/convex patterns. In the same way, the concept of "data track patterns in which the concaves are disposed in one of concentric circles and a spiral" in the present specification includes data track patterns of a patterned medium where concaves (which are filled with recording material) are disposed in concentric circles or a spiral as recording elements that are separated in both the radial direction and the direction of rotation of the information recording medium by convexes in the concave/convex patterns.

Also, the expression "unit convex length" in the present specification refers to a standard length for detecting the presence of one convex when a magnetic signal is read from the information recording medium. Accordingly, on an actual information recording medium, the servo patterns are constructed by forming convexes with a length that is an integer multiple of the unit convex length in accordance with the content of the servo data. Note that the standard length for detecting the presence of one convex may be set at the same length in an entire servo pattern or can be set at a different length in each pattern in accordance with the various patterns (preamble patterns, address patterns, burst patterns, and the like) that construct the servo patterns. In this case, with a construction where the protruding end parts of the convexes are formed of recording material, the formation positions of convexes are detected as "detection signal outputted" or "detection signal with high signal level" and with a construction where the protruding end parts of the convexes are formed of non-recording material, the formation positions of convexes are detected as "no detection signal outputted" or "detection signal with low signal level". In this case, even if extremely small manufacturing errors occur and the unit convex length in the concave/convex patterns in one of the ring-shaped regions slightly differs to a length that is proportionate to the distance from the center of the data track patterns (i.e., even if the length is substantially equal to a length that is proportionate to the distance from the center), the unit convex lengths in such concave/convex patterns are included in a range of the concept of "a length proportionate to the distance from the center".

Also, the expression "unit concave length" in the present specification refers to a standard length for detecting the presence of one concave when a magnetic signal is read from the information recording medium. Accordingly, on an actual information recording medium, the servo patterns are constructed by forming concaves with a length that is an integer multiple of the unit concave length in accordance with the content of the servo data. Note that the standard length for detecting the presence of one concave may be set at the same length in an entire servo pattern or can be set at a different length in each pattern in accordance with the various patterns (preamble patterns, address patterns, burst patterns, and the like) that construct the servo patterns. In this case, with a construction where the concaves are filled with non-recording material, the formation positions of concaves are detected as "no detection signal outputted" or "detection signal with low signal level" and with a construction where the concaves are filled with recording material, the formation positions of concaves are detected as "detection signal outputted" or "detection signal with high signal level". In this case, even if extremely small manufacturing errors occur and the unit concave length in the concave/convex patterns in one of the ring-shaped regions slightly differs to a length that is proportionate to the distance from the center of the data region patterns (i.e., even if the length is substantially equal to a length that is proportionate to the distance from the center), the unit concave lengths in such concave/convex patterns are included in the range of the concept of "a length proportionate to the distance from the center".

In addition, the expression "the distance from the center of the data track patterns to the ring-shaped region" in the present specification includes not only "the distance from the center of the data track patterns to the innermost position of the ring-shaped region" and "the distance from the center of the data track patterns to the outermost position of the ring-shaped region" but also "the distance from the center of the data track patterns to an arbitrary position in the radial direction, such as the center position, of the ring-shaped region". However, the position used to define such distance is the same position for every ring-shaped region. Also, the expression "average of the unit convex length in each ring-shaped region" includes not only "a value produced by dividing the sum of the unit convex lengths of every servo track from the innermost periphery to the outermost periphery in a ring-shaped region by the number of servo tracks in the ring-shaped region" for example, but also "a value produced by dividing the sum of the unit convex length in the innermost periphery of a ring-shaped region and the unit convex length in the outermost periphery of the ring-shaped region by two".

In the same way, the expression "average of the unit concave lengths in each ring-shaped region" includes not only "a value produced by dividing the sum of unit concave lengths of every servo track from the innermost periphery to the outermost periphery in a ring-shaped region by the number of servo tracks in the ring-shaped region" for example, but also "a value produced by dividing the sum of the unit concave length in the innermost periphery of a ring-shaped region and the unit concave length in the outermost periphery of the ring-shaped region by two".

On another information recording medium according to the present invention, data track patterns and servo patterns are formed on at least one surface of a substrate by concave/convex patterns with plural convexes, at least protruding end parts of which are formed of one of a recording material and a non-recording material, and concaves, which are filled with another of the recording material and the non-recording material, wherein the concave/convex patterns that construct the data track patterns are formed so that the convexes and the concaves are disposed in one of concentric circles and a spiral, the concave/convex patterns that construct the data track patterns and the servo patterns are divided into plural ring-shaped regions that are concentric with the data track patterns, in the concave/convex patterns that construct the servo patterns, unit convex lengths and unit concave lengths are set in each ring-shaped region so that a unit convex length along a direction of rotation of the substrate and a unit concave length along the direction of rotation become longer in each ring-shaped region from an inner periphery of the ring-shaped region to an outer periphery of the ring-shaped region in proportion to a distance from a center of the data track patterns and so that a value produced by dividing an average of the unit convex length inside each ring-shaped region by a distance from the center of the data track patterns to the ring-shaped region and a value produced by dividing an average of the unit concave length inside each ring-shaped region by a distance from the center of the data track patterns to the ring-shaped region decrease from an inner-periphery ring-shaped region to an outer-periphery ring-shaped region, the plural of ring-shaped regions are composed of plural first ring-shaped regions and at least one second ring-shaped region, respective lengths along a radial direction of the substrate of the first ring-shaped regions are set so as to increase from an inner-periphery first ring-shaped region toward an outer-periphery first ring-shaped region, and in the at least one second ring-shaped region, unit convex lengths are set so that an innermost unit convex length in the at least one second ring-shaped region is no shorter than a shortest length out of innermost unit convex lengths in the respective first ring-shaped regions and an outermost unit convex length in the at least one second ring-shaped region is no greater than a longest length out of outermost unit convex lengths in the respective first ring-shaped regions, and unit concave lengths are set so that an innermost unit concave length in the at least one second ring-shaped region is no shorter than a shortest length out of innermost unit concave lengths in the respective first ring-shaped regions and an outermost unit concave length in the at least one second ring-shaped region is no greater than a longest length out of outermost unit concave lengths in the respective first ring-shaped regions.

A recording/reproducing apparatus according to the present invention includes: either of the information recording media described above; and a control unit that carries out servo control based on servo data associated with the servo patterns.

Therefore, according to the information recording medium and the recording/reproducing apparatus according to the present invention, compared to the magnetic disk 10*ax*, where there is a tendency for the innermost unit convex length and the innermost unit concave length in the inner-periphery ring-shaped region Ax to be shorter than the unit convex length and the unit concave length at other positions, and the magnetic disk 10*bx*, where there is a tendency for the outermost unit convex length and the outermost unit concave length in the inner-periphery ring-shaped region Ax to be longer than the unit convex length and the unit concave length at other positions, due to the lengths Lx in the radial direction of the respective ring-shaped regions Ax being equal, the difference between the shortest unit convex length out of the entire range from a first ring-shaped region in the inner periphery to a first ring-shaped region in the outer periphery and the longest unit convex length out of the entire range from the first ring-shaped region in the inner periphery to the first ring-shaped region in the outer periphery can be sufficiently reduced, and the difference between the shortest unit concave length out of the entire range from the first ring-shaped region in the inner periphery to the first ring-shaped region in the outer periphery and the longest unit convex length out of the entire range from the first ring-shaped region in the inner periphery to the first ring-shaped region in the outer periphery can be sufficiently reduced.

This means that according to the information recording medium and the recording/reproducing apparatus according to the present invention, since it is possible to press the convexes of a stamper into a layer of resin material used to form a mask pattern substantially uniformly across the entire stamper when manufacturing the information recording medium by imprinting, it is possible to avoid a situation where the open lengths of any of the concaves become different to the desired open lengths during the removal of residue. Therefore, according to the information recording medium and the recording/reproducing apparatus according to the present invention, since it is possible to manufacture the magnetic disk using a mask pattern with concaves with the desired open lengths, it is possible to set the open lengths of the concaves in the servo patterns at the desired open lengths, and as a result it will be possible to properly read the servo data.

Also, according to the information recording medium and the recording/reproducing apparatus according to the present invention, when forming the concave/convex patterns by etching using a mask pattern for example, it will be possible to sufficiently reduce the difference in the width of open surfaces between concaves with wide open surfaces and concaves with narrow open surfaces, and therefore it is possible to avoid a situation where any of the formed concaves becomes excessively deep. Also, when etching the layer of non-recording material (or a layer of recording material) formed so as to cover the convexes, it will be possible to sufficiently reduce the difference in the width of protruding end surfaces between the convexes with wide protruding end surfaces and the convexes with narrow protruding end surfaces in the concave/convex patterns present below the layer of the non-recording material (or the layer of recording material), and therefore it will be possible to avoid a situation where the difference between the thickness of the residue on the outermost convexes of the first ring-shaped region in the inner periphery and the thickness of the residue on the convexes formed at other positions is large. Also, when the non-recording material (or recording material) is etched so that residue is not present on the convexes in the entire range from the first ring-shaped region in the inner periphery to the first ring-shaped region in the outer periphery, it will also be possible to remove the residue from above the convexes without creating a situation where there is deterioration in the smoothness and/or where the convexes are excessively etched in the inner periphery of the first ring-shaped region in the inner periphery. Accordingly, it will be possible to maintain favorable smoothness for the information recording medium across the first ring-shaped regions. When the information recording medium according to the present invention is a magnetic recording medium (a magnetic disk), since it will be possible to keep the flying height of a magnetic head above the magnetic recording medium substantially equal in the first ring-shaped regions, according to a recording/reproducing apparatus equipped with such magnetic recording medium, it will be possible to carry out stabilized recording and reproducing.

In addition, according to the information recording medium and the recording/reproducing apparatus where the unit convex length and the unit concave length are set so as to increase in each ring-shaped region from the inner periphery of the ring-shaped region toward the outer periphery of the ring-shaped region in proportion to the distance from the center, the sum of the unit convex length and the unit concave length (that is, the formation pitch of the convexes and the formation pitch of the concaves) will increase in each ring-shaped region from the inner periphery toward the outer periphery thereof in proportion to the distance from the center. This means that it will be possible to reliably read (detect) the servo data from the servo pattern regions across the entire range from the innermost periphery to the outermost periphery of each ring-shaped region while rotating the information recording medium with a fixed angular velocity and without changing the frequency information (read frequency information), which is the standard for the clock used when reading the servo data from the servo pattern regions, within one ring-shaped region.

Also, on the information recording medium according to the present invention, the unit convex lengths may be set so that a ratio of the unit convex length in an outermost periphery of the first ring-shaped region to the unit convex length in an innermost periphery of the first ring-shaped region is equal in every first ring-shaped region, and the unit concave lengths may be set so that a ratio of the unit concave length in the outermost periphery of the first ring-shaped region to the unit concave length in the innermost periphery of the first ring-shaped region is equal in every first ring-shaped region. Note that in the present specification, the expression "innermost periphery of the ring-shaped region" refers to an "innermost periphery inside a ring-shaped region" and the expression "outermost periphery of the ring-shaped region" refers to an "outermost periphery inside a ring-shaped region". Also, for the present invention, even when extremely small manufacturing errors occur and there are slight fluctuations in the "ratio of the unit convex length in an outermost periphery of the first ring-shaped region to the unit convex length in an innermost periphery of the first ring-shaped region" in each first ring-shaped region (i.e., a state where the "ratios" described above are "substantially equal"), such state is still included in the concept of a "state where the ratio is equal in each first ring-shaped region". In the same way, for the present invention, even when extremely small manufacturing errors occur and there are slight fluctuations in the "ratio of the unit concave length in the outermost periphery of the first ring-shaped region to the unit concave length in the innermost periphery of the first ring-shaped region" in each first ring-shaped region (i.e., a state where the "ratios" described above are "substantially equal"), such state is still included in the concept of a "state where the ratio is equal in each first ring-shaped region".

A recording/reproducing apparatus according to the present invention includes: the information recording medium described above; and a control unit that carries out servo control based on servo data associated with the servo patterns.

Also, according to the information recording medium and the recording/reproducing apparatus according to the present invention, it is possible to maintain even more favorable smoothness in every first ring-shaped region from a first ring-shaped region in the inner periphery to a first ring-shaped region in the outer periphery without producing fluctuations in smoothness between the respective first ring-shaped regions. As a result, when the information recording medium according to the present invention is a magnetic recording medium (a magnetic disk), it is possible to keep the flying height of a magnetic head above the magnetic recording medium even more uniform across the entire range.

In addition, on the information recording medium according to the present invention, the unit convex lengths may be set so that the unit convex length in an outermost periphery of the first ring-shaped region is equal in every first ring-shaped region, and the unit concave lengths may be set so that the unit concave length in an outermost periphery of the first ring-shaped region is equal in every first ring-shaped region. Note that for the present invention, even in a state where extremely small manufacturing errors occur and in any of the first ring-shaped regions, there are fluctuations in one of the unit convex length in the outermost periphery of the first ring-shaped region and/or the unit concave length in the outermost periphery in the first ring-shaped region (i.e., a state where the unit convex lengths in the outermost periphery of every first ring-shaped region are substantially equal and a state where the unit concave lengths in the outermost periphery of every first ring-shaped region are substantially equal), such lengths are still included in the concept of "equal lengths".

In addition, on the information recording medium according to the present invention, the unit convex lengths may be set so that the unit convex length in an innermost periphery of the first ring-shaped region is equal in every first ring-shaped region, and the unit concave lengths may be set so that the unit concave length in an innermost periphery of the first ring-shaped region is equal in every first ring-shaped region. Note that for the present invention, even in a state where extremely small manufacturing errors occur and in any of the first ring-shaped regions, there are fluctuations in one of the unit convex length in the innermost periphery of the first ring-shaped region and/or the unit concave length in the innermost periphery in the first ring-shaped region (a state where the unit convex lengths in the innermost periphery of every first ring-shaped region are substantially equal and a state where the unit concave lengths in the innermost periphery of every first ring-shaped region are substantially equal in each first ring-shaped region), such lengths are still included in the concept of "equal lengths".

A recording/reproducing apparatus according to the present invention includes: any of the information recording media described above; and a control unit that carries out servo control based on servo data associated with the servo patterns.

According to the information recording medium and the recording/reproducing apparatus according to the present invention, since the difference between the longest unit convex length in all of the first ring-shaped regions and the shortest unit convex length in all of the first ring-shaped regions can be made significantly smaller and the difference between the longest unit concave length in all of the first ring-shaped regions and the shortest unit concave length in all of the first ring-shaped regions can be made significantly smaller, it is possible to significantly reduce machining fluctuations during the manufacturing of the information recording medium, and as a result, it is possible to significantly improve the smoothness of the information recording medium.

On a stamper according to the present invention, concave/convex patterns including convexes formed corresponding to concaves in the concave/convex patterns of any of the information recording media described above and concaves formed corresponding to convexes in the concave/convex patterns of the information recording medium are formed.

According to this stamper, unlike for example a method of manufacturing that forms the mask pattern for use during etching (i.e., concave/convex patterns used as a mask during etching that forms the servo patterns and the like) by using an electron beam drawing apparatus to draw an exposure pattern on a resin layer of a preform for manufacturing an information recording medium and by then developing the exposure pattern, it is possible to easily form the mask pattern for use during etching in a short time by merely pressing the concave/convex patterns of the stamper into the resin layer. It is also possible to form the mask pattern for used during etching in a large number of preforms using a single stamper. Accordingly, the manufacturing cost of an information recording medium can be sufficiently reduced. In addition, it is possible to form a mask pattern for use during etching in which the concaves are formed with the desired open widths.

It should be noted that the disclosure of the present invention relates to a content of Japanese Patent Application 2007-338977 that was filed on 28 Dec. 2007, the entire content of which is herein incorporated by reference.

BRIEF DESCRIPTION OF THE DRAWINGS

These and other objects and features of the present invention will be explained in more detail below with reference to the attached drawings, wherein:

FIG. 17 is a diagram useful in explaining examples of the lengths along the radial direction of the ring-shaped regions on the magnetic disk shown in FIG. 3, the ratios of the lengths along the radial direction of ring-shaped regions that are adjacent in the radial direction, the unit convex length and the unit concave length at each distance from the center O, the averages of the unit convex length and the unit concave length in each ring-shaped region, values produced by dividing the averages of the unit convex length and the unit concave length by the distance from the center O, and the read frequency for each ring-shaped region;

FIG. 22 is a plan view of a conventional magnetic disk;

FIG. 23 is a plan view of a servo pattern region on the magnetic disk shown in FIG. 22;

DESCRIPTION OF THE PREFERRED EMBODIMENTS

Preferred embodiments of an information recording medium, a recording/reproducing apparatus, and a stamper according to the present invention will now be described with reference to the attached drawings.

Figure 1:
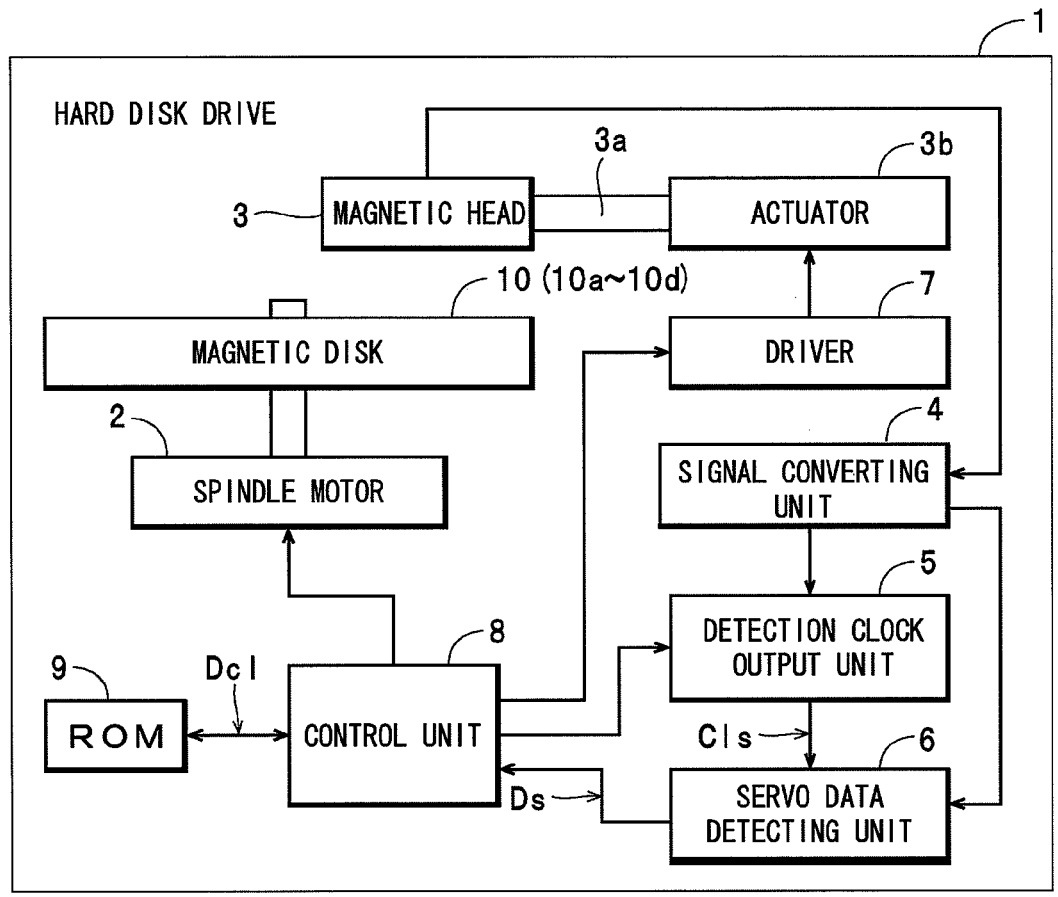
FIG. 1 is a block diagram showing the construction of a hard disk drive.
Figure 2:
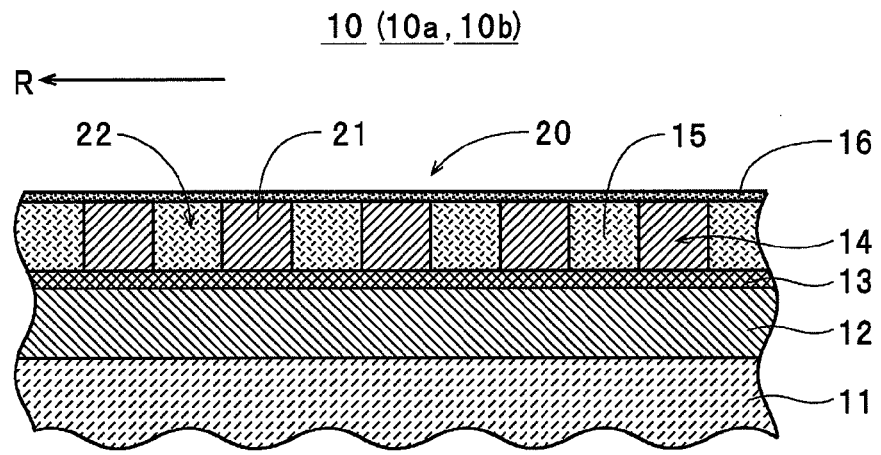
FIG. 2 is a cross-sectional view showing the multilayer structure of a magnetic disk.
Figure 7:
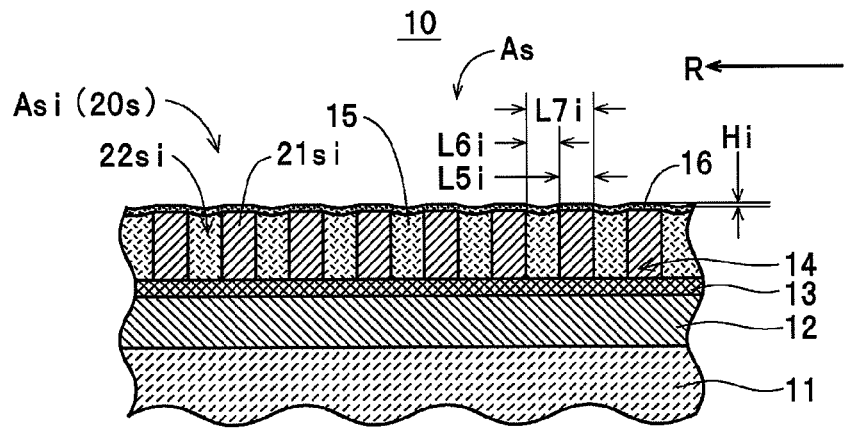
FIG. 7 is a cross-sectional view of an inner-periphery servo pattern region on the magnetic disk shown in FIG. 3.
Figure 9:
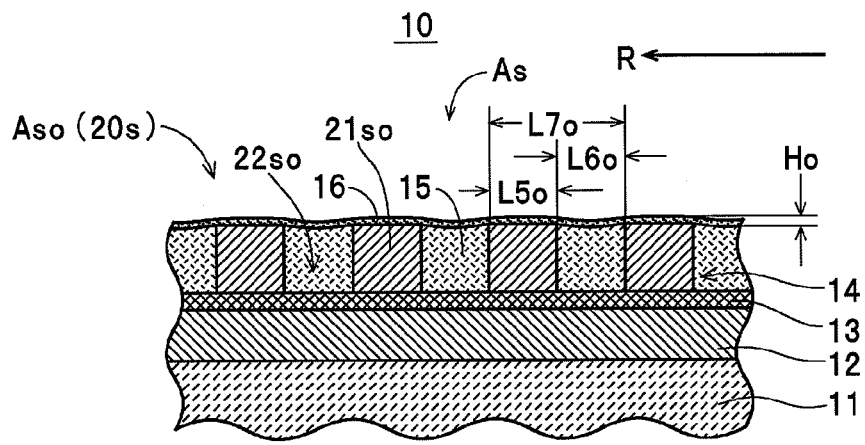
FIG. 9 is a cross-sectional view of an outer-periphery servo pattern region on the magnetic disk shown in FIG. 3.

A hard disk drive 1 shown in FIG. 1 is a magnetic recording/reproducing apparatus as one example of a "recording/reproducing apparatus" according to the present invention and includes a spindle motor 2, a magnetic head 3, a signal converting unit 4, a detection clock output unit 5, a servo data detecting unit 6, a driver 7, a control unit 8, a ROM 9, and a magnetic disk 10. Here, as one example, the magnetic disk 10 is a discrete track-type magnetic disk (patterned medium) on which recording data can be recorded by perpendicular recording, and corresponds to an "information recording medium" according to the present invention. More specifically, as shown in FIG. 2, the magnetic disk 10 is constructed so that a soft magnetic layer 12, an intermediate layer 13, and a magnetic layer 14 are formed in the mentioned order on a glass base plate 11. Note that although a state where the surface of the magnetic disk 10 is smooth (i.e., where no concaves and convexes are present) is shown in FIG. 2 for ease of understanding the multilayer construction of the magnetic disk 10, in reality, as shown in FIGS. 7 and 9, there are cases where extremely small concaves and convexes produced during manufacturing are present on the surface. Also, although in reality the soft magnetic layer 12, the intermediate layer 13, the magnetic layer 14, and the like are formed and servo patterns and data track patterns are formed on both front and rear surfaces of the glass base plate 11 (11a) on the magnetic disk 10 and magnetic disks 10a to 10d that will be described later, for ease of understanding the present invention, such layers and patterns are shown on only one surface of the glass base plate 11 (11a).

Here, the magnetic layer 14 formed on the intermediate layer 13 constructs predetermined concave/convex patterns 20 by having convexes 21 formed of a magnetic material (one example of a "recording material" for the present invention) and concaves 22 alternately formed. The concaves 22 are filled with a non-magnetic material 15 such as $SiO_2$, C (carbon), Si, Ge, a non-magnetic metal material, or a resin material (one example of a "non-recording material" for the present invention). In addition, a thin film of diamond-like carbon (DLC), as one example, is formed by chemical vapor deposition (CVD) to produce a protective layer (DLC layer) 16 with a thickness of around 2 nm on the non-magnetic material 15 that fills the concaves 22 and on the convexes 21. A lubricant (as one example, a fluorine lubricant) is also applied onto the surface of the protective layer 16 of the magnetic disk 10.

The glass base plate 11 corresponds to a "substrate" for the present invention and is formed with a thickness of around 0.6 mm by polishing the surface of a glass plate with a diameter of 1.8 inches until the surface roughness Ra is around 0.2 nm to 0.3 nm. It should be noted that the substrate for the present invention is not limited to a substrate of a glass material and it is possible to form the substrate from various types of non-recording material (non-magnetic material) such as aluminum and ceramics. The soft magnetic layer 12 is formed with a thickness of around 100 nm to 200 nm by sputtering a soft magnetic material such as CoZrNb alloy. The intermediate layer 13 functions as an underlayer for forming the magnetic layer 14 and is formed with a thickness of around 40 nm by sputtering an intermediate layer forming material such as Cr or a non-magnetic CoCr alloy. The magnetic layer 14 is a layer composed of the convexes 21 formed of the recording material (magnetic material). As described later, the convexes 21 (the concave/convex patterns 20) are formed by carrying out a process that sputters a CoCrPt alloy, for example, and a process that forms the concaves 22 by etching using a resist pattern or the like as a mask in the mentioned order.

Figure 3:
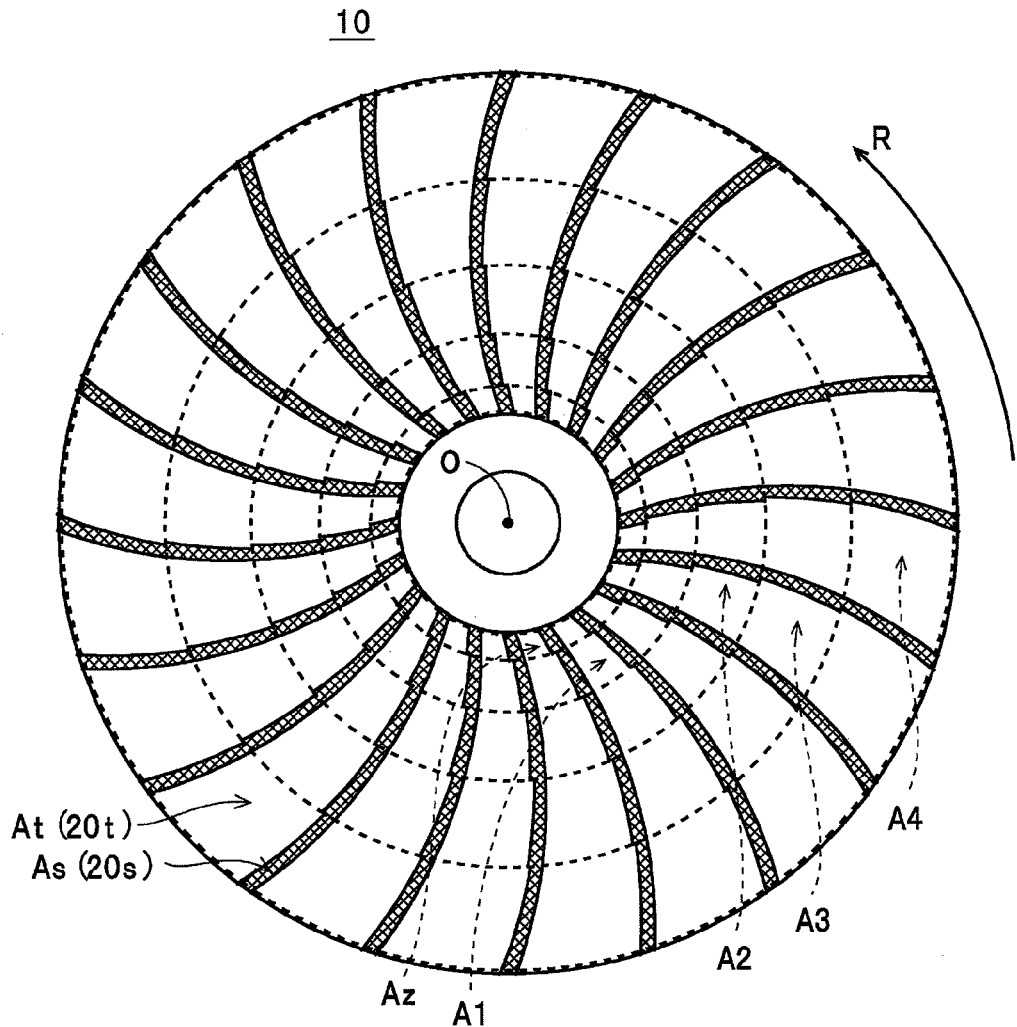
FIG. 3 is a plan view of the magnetic disk.

As shown in FIG. 3, on the magnetic disk 10, the concave/convex patterns 20 (concave/convex patterns 20t, concave/convex patterns 20s) are formed so as to be divided into five ring-shaped regions Az, A1 to A4 (hereinafter referred to as the "ring-shaped regions A" when no distinction is required) that are in the form of concentric circles and are centered on a center O of the concave/convex patterns 20 (the concave/convex patterns 20t). In other words, the ring-shaped regions A are concentric with the concave/convex patterns 20t. Note that for the hard disk drive 1, the ring-shaped region Az corresponds to an "innermost ring-shaped region" and a "second ring-shaped region" for the present invention, the ring-shaped regions A1 to A3 correspond to "first ring-shaped regions" for the present invention, and the ring-shaped region A4 corresponds to an "outermost ring-shaped region" and a "first ring-shaped region" for the present invention. In this case, the number of regions that correspond to the "first ring-shaped region" for the present invention is not limited to the example described above and it is possible to provide two or an arbitrary higher number of first ring-shaped regions from an innermost periphery to an outermost periphery of the magnetic disk 10 (i.e., in the region where the concave/convex patterns 20t, 20s are formed). The number of regions that correspond to the "second ring-shaped region" for the present invention is also not limited to the example described above and it is possible to provide two or an arbitrary higher number of second ring-shaped regions from an innermost periphery to an outermost periphery of the magnetic disk 10.

Figure 4:
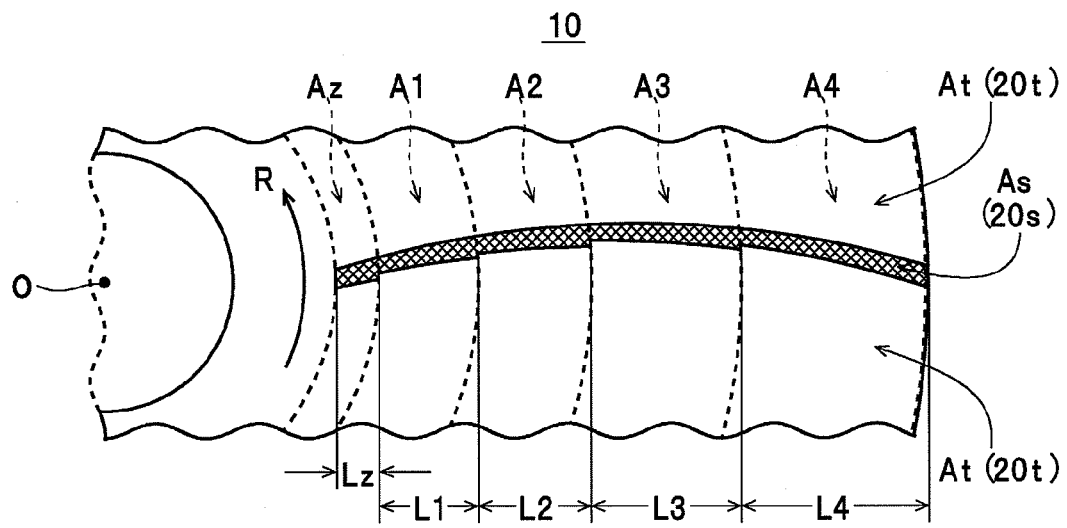
FIG. 4 is a plan view of servo pattern regions on the magnetic disk shown in FIG. 3.
Figure 18:
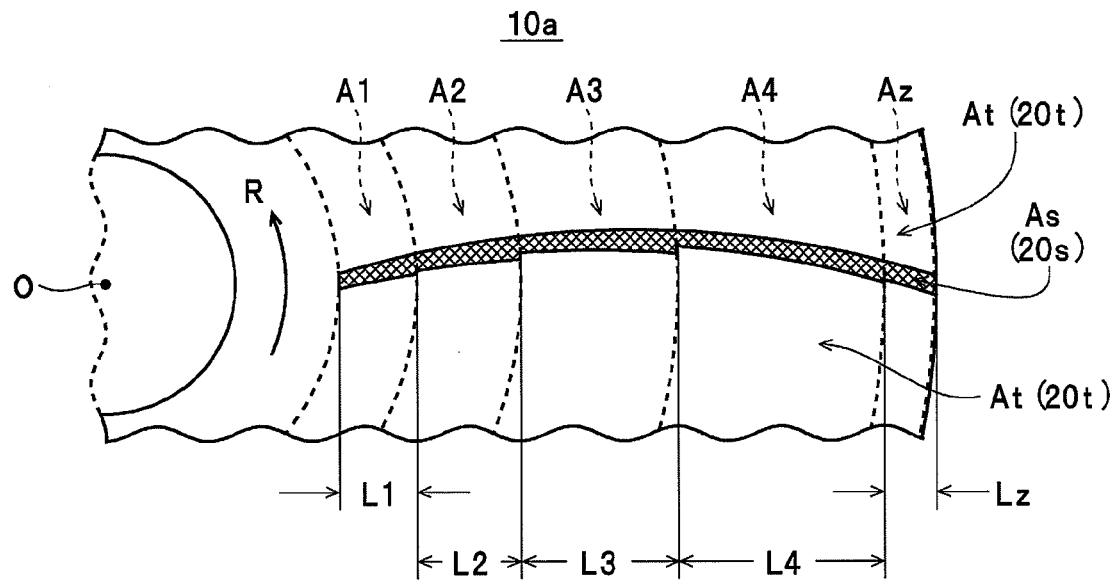
FIG. 18 is a plan view of servo pattern regions on another magnetic disk.

Here, on the magnetic disk 10, as shown in FIG. 4, the lengths L1 to L4 along the radial direction of the magnetic disk 10 of the respective ring-shaped regions A1 to A4 (the ring-shaped regions A out of all of the ring-shaped regions A aside from one or both of the innermost ring-shaped region A and the outermost ring-shaped region A: in this example, the ring-shaped regions A out of all of the ring-shaped regions A aside from the innermost ring-shaped region A (here labeled the "ring-shaped region Az")) are set so as to increase for each ring-shaped region A toward the outer periphery of the magnetic disk 10. More specifically, as shown in FIG. 17, on the magnetic disk 10, as one example the length L1 along the radial direction of the ring-shaped region A1 is 2.122 mm, the length L2 along the radial direction of the ring-shaped region A2 is 2.546 mm, the length L3 along the radial direction of the ring-shaped region A3 is 3.056 mm, and the length L4 along the radial direction of the ring-shaped region A4 is 3.667 mm. In this case, on the magnetic disk 10, the ratio of the length L2 of the ring-shaped region A2 to the length L1 of the ring-shaped region A1, the ratio of the length L3 of-the ring-shaped region A3 to the length L2 of the ring-shaped region A2, and the ratio of the length L4 of the ring-shaped region A4 to the length L3 of the ring-shaped region A3 are all equal (in this example, 1:1.2). Note that for ease of understanding the present invention, in FIG. 4 and in FIGS. 18 to 19 referred to later, the ratio of the lengths along the radial direction of the respective ring-shaped regions A are shown differently to the actual ratios of the lengths. Also, on the magnetic disk 10, the length Lz along the radial direction of the innermost ring-shaped region Az is 0.610 mm and is shorter than the length L1 (2.122 mm) along the radial direction of the ring-shaped region A1 set outside the innermost ring-shaped region Az. Note that oh the magnetic disk 10, the ratio of the length L1 of the ring-shaped region A1 to the length Lz of the ring-shaped region Az is 1:3.5.

Figure 6:
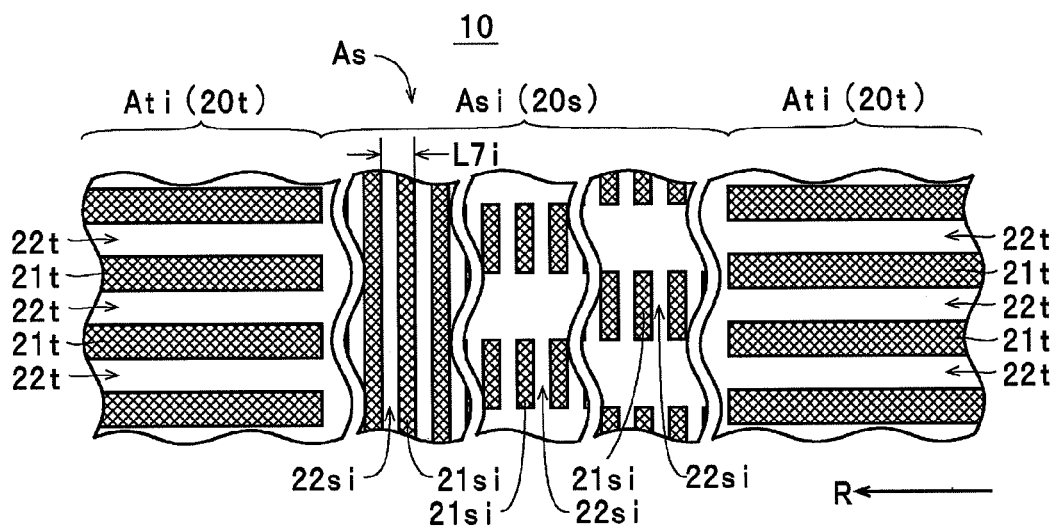
FIG. 6 is a plan view of an inner-periphery servo pattern region inside a ring-shaped region on the magnetic disk shown in FIG. 3.
Figure 8:
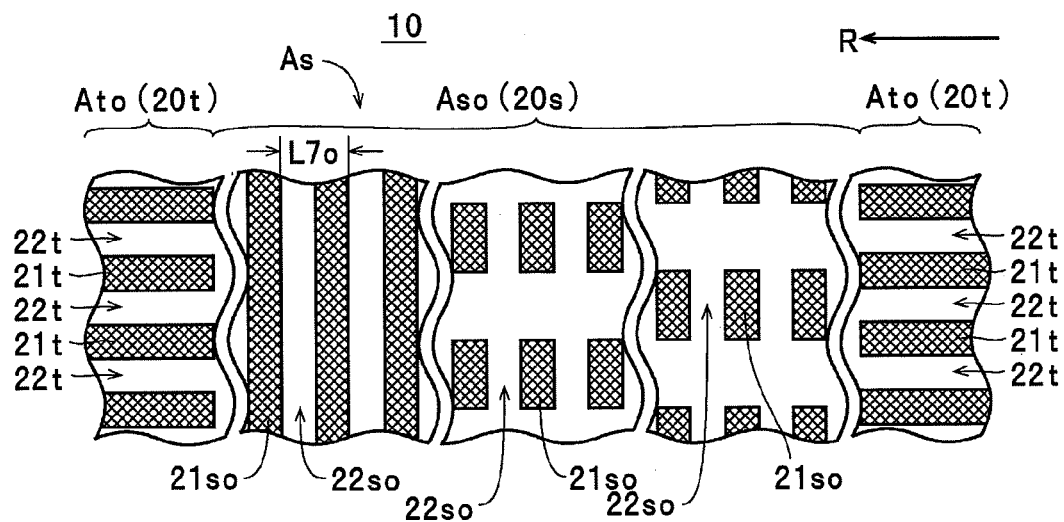
FIG. 8 is a plan view of an outer-periphery servo pattern region inside a ring-shaped region on the magnetic disk shown in FIG. 3.

As shown in FIG. 3, servo pattern regions As are also provided between data track pattern regions At on the magnetic disk 10, with the data track pattern regions At and the servo pattern regions As being alternately disposed in the direction of rotation (the direction of the arrow R) of the magnetic disk 10. Also, as shown in FIGS. 6 and 8, concave/convex patterns 20t are formed as data track patterns in the data track pattern regions At (an inner-periphery data track pattern region Ati on an inner periphery side of each ring-shaped region A and an outer-periphery data track pattern region Ato on an outer periphery side of each ring-shaped region A). Here, each concave/convex pattern 20t is composed of a large number of concentric convexes 21t (data recording tracks) whose center O (see FIGS. 3, 4) is the center of rotation of the magnetic disk 10 and concaves 22t present between the respective convexes 21t. It should be noted that although it is preferable for the center O of the concave/convex patterns 20t to match the center of rotation of the magnetic disk 10, in reality, there are cases where an extremely small displacement of around 30 μm to 50 μm is produced due to manufacturing error. However, since tracking servo control can still be performed sufficiently for the magnetic head 3 when a displacement of such magnitude is present, the center of rotation and the center O can be thought of as effectively matching. Also, the concaves 22t of the concave/convex patterns 20t are filled with the non-magnetic material 15 to make the surface of the data track pattern regions At smooth.

Figure 5:
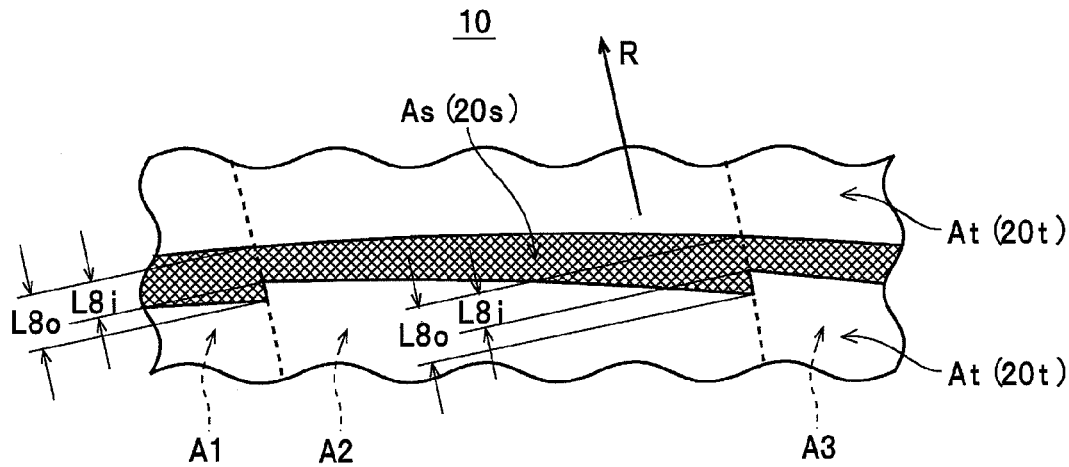
FIG. 5 is another plan view of servo pattern regions on the magnetic disk shown in FIG. 3.

Also, as shown by FIGS. 6 and 8, concave/convex patterns 20s are formed as servo patterns in the servo pattern regions As (an inner-periphery servo pattern region Asi on the inner periphery side of each ring-shaped region A and an outer-periphery servo pattern region Aso on the outer periphery side of each ring-shaped region A). Here, on the magnetic disk 10, as shown in FIG. 5, the length L8i along the direction of rotation of the innermost servo pattern region As in each ring-shaped region A1 to A4 is set equal and the length L8o along the direction of rotation of the outermost servo pattern region As in each ring-shaped region A1 to A4 is also set equal. Also, the length along the direction of rotation of the innermost servo pattern region As in the innermost ring-shaped region Az is set longer than the length L8i described above and the length along the direction of rotation of the outermost servo pattern region As in the ring-shaped region Az is set equal to the length L8o described above.

Also, as shown in FIGS. 6 to 9, on the magnetic disk 10, each concave/convex pattern 20s that constructs various types of servo pattern such as a preamble pattern, an address pattern, and burst patterns is composed of convexes 21s (convexes 21si and convexes 21so), and concaves 22s (concaves 22si and concaves 22so). In this case, on the magnetic disk 10, as one example, a front portion in the direction of rotation of each concave/convex pattern 20s that constructs a preamble pattern (i.e., the front end in the direction of rotation of a first convex 21s in the direction of rotation out of the convexes 21s used as a preamble pattern) is connected from the innermost ring-shaped region Az to the outermost ring-shaped region A4. That is, on the magnetic disk 10, the front positions in the direction of rotation of the servo patterns in the ring-shaped regions Az to A4 are aligned so as to be continuous.

Note that in FIGS. 6 to 9, for ease of understanding the present invention, an example is shown where the concave/convex pattern 20s is constructed of only convexes 21s (the convexes 21si, 21so) whose length along the direction of rotation is equal to the unit convex length and concaves 22s (the concaves 22si, 22so) whose length along the direction of rotation is equal to the unit concave length. Accordingly, although the length along the direction of rotation of the convexes 21s is set as the unit convex length and the length along the direction of rotation of the concaves 22s is set as the unit concave length in the following explanation, on an actual magnetic disk 10a, the number, formation positions, and lengths along the direction of rotation of the convexes 21s and the concaves 22s differ to the state shown in the respective drawings, and each concave/convex pattern 20s is formed with the number, formation positions, and lengths along the direction of rotation of the convexes 21s and the concaves 22s set corresponding to various types of control data including information (patterns) such as track addresses and sector addresses required for tracking servo control. More specifically, the actual lengths of the convexes 21s and the concaves 22s are integer multiples of the lengths of the convexes 21s and the concaves 22s shown in the drawings (i.e., integer multiples of the unit convex length and the unit concave length).

In this case, on the magnetic disk 10, as one example, at equal radius positions where the distance from the center O is equal, the unit convex length (i.e., the length along the direction of rotation of the convexes 21s: the lengths L5i, L5o shown in FIGS. 7 and 9) and the unit concave length (i.e., the length along the direction of rotation of the concaves 22s: the lengths L6i, L6o shown in FIGS. 7 and 9) are set at equal lengths. Also, on the magnetic disk 10, the unit convex length and the unit concave length are set so as to gradually increase in each ring-shaped region A from the inner periphery toward the outer periphery of the ring-shaped region in proportion to the distance from the center O of the concave/convex patterns 20t. Accordingly, on the magnetic disk 10, the sum of the unit convex length and the unit concave length (the lengths L7i, L7o shown in FIGS. 6 to 9: the formation pitch of the convexes 21s and the formation pitch of the concaves 22s) becomes gradually longer from the inner periphery to the outer periphery in each ring-shaped region A in proportion to the distance from the center O of the concave/convex patterns 20t. For this reason, as described later, when the magnetic disk 10 is rotated at a constant angular velocity, it is possible to carry out reads of servo data and recording data and writes of recording data within one ring-shaped region A without changing the frequency of the detection clock signal.

Also, on the magnetic disk 10, as shown in FIG. 17, the innermost unit convex length in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (here labeled the "ring-shaped region Az")) is set at the same length and the innermost unit concave length in such ring-shaped regions A1 to A4 is also set at the same length (in this example, both the unit convex length and the unit concave length are 50.00 nm). In addition, on the magnetic disk 10, the outermost unit convex length in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (here labeled the "ring-shaped region Az")) is set at the same length and the outermost unit concave length in such ring-shaped regions A1 to A4 is also set at the same length (in this example, both the unit convex length and the unit concave length are 60.00 nm). Accordingly, on the magnetic disk 10, the difference between the unit convex length in the innermost periphery and the unit convex length in the outermost periphery of the respective ring-shaped regions A1 to A4 is extremely small at 10.00 nm and the difference between the unit concave length in the innermost periphery and the unit concave length in the outermost periphery of the respective ring-shaped regions A1 to A4 is also extremely small at 10.00 nm.

On the magnetic disk 10, in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (here labeled the "ring-shaped region Az")), the longest unit convex length out of the innermost unit convex lengths (in the present embodiment, the innermost unit convex length is equal in all of the ring-shaped regions A1 to A4 at 50.00 nm) is set shorter than the shortest unit convex length out of the outermost unit convex lengths in the ring-shaped regions A1 to A4 (in the present embodiment, the outermost unit convex length is equal in all of the ring-shaped regions A1 to A4 at 60.00 nm) In the same way, on the magnetic disk 10, in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (here labeled the "ring-shaped region Az")), the longest unit concave length out of the innermost unit concave lengths (in the present embodiment, the innermost unit concave length is equal in all of the ring-shaped regions A1 to A4 at 50.00 nm) is set shorter than the shortest unit concave length out of the outermost unit concave lengths in the ring-shaped regions A1 to A4 (in the present embodiment, the outermost unit concave length is equal in all of the ring-shaped regions A1 to A4 at 60.00 nm).

In addition, on the magnetic disk 10, the longest unit convex length out of the innermost unit convex lengths in all of the ring-shaped regions Az, A1 to A4 (in this example, 56.55 nm that is the innermost unit convex length in the ring-shaped region Az) is set shorter than the shortest unit convex length out of the outermost unit convex lengths in all of the ring-shaped regions Az, A1 to A4 (in this example, the outermost unit convex lengths in the ring-shaped regions Az, A1 to A4 are equal at 60.00 nm). In the same way, on the magnetic disk 10, the longest unit concave length out of the innermost unit concave lengths in all of the ring-shaped regions Az, A1 to A4 (in this example, 56.55 nm that is the innermost unit concave length in the ring-shaped region Az) is set shorter than the shortest unit concave length out of the outermost unit concave lengths in all of the ring-shaped regions Az, A1 to A4 (in this example, the outermost unit concave lengths in the ring-shaped regions Az, A1 to A4 are equal at 60.00 nm).

On the magnetic disk 10, the average of the unit convex lengths in each of the ring-shaped regions A1 to A4 (as one example, a value produced by dividing the sum of the innermost unit convex length and the outermost unit convex length in a ring-shaped region A by two) and the average of the unit concave length in each of the ring-shaped regions A1 to A4 (as one example, a value produced by dividing the sum of the innermost unit concave length and the outermost unit concave length in each ring-shaped region A by two) are equal (in this example, at 55.00 nm). For this reason, on the magnetic disk 10, a value produced by dividing the average of the unit convex length in a ring-shaped region A by the distance from the center O to the ring-shaped region A (as one example, a distance between the innermost portion of the ring-shaped region A and the center O) and a value produced by dividing the average of the unit concave length in a ring-shaped region A by the distance from the center O to the ring-shaped region A fall from a ring-shaped region A in the inner periphery to a ring-shaped region A in the outer periphery.

On the magnetic disk 10 where the innermost unit convex length is set equal in the ring-shaped regions A1 to A4 and the outermost unit convex length is set equal in the ring-shaped regions A1 to A4, the ratio of the outermost unit convex length in a ring-shaped region A to the innermost unit convex length in the ring-shaped region A will be the same (in this example, 1:1.2) in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (the ring-shaped region Az)). In the same way, on the magnetic disk 10 where the innermost unit concave length is set equal in the ring-shaped regions A1 to A4 and the outermost unit concave length is set equal in the ring-shaped regions A1 to A4, the ratio of the outermost unit concave length in a ring-shaped region A to the innermost unit concave length in the ring-shaped region A will be the same (in this example, 1:1.2) in the respective ring-shaped regions A1 to A4 (the ring-shaped regions A out of all of the ring-shaped regions A aside from one or both of the innermost ring-shaped region A and the outermost ring-shaped region A: in this example, all of the ring-shaped regions A aside from the innermost ring-shaped region A (the ring-shaped region Az)).

In this case, in the innermost ring-shaped region Az, the innermost unit convex length in the ring-shaped region Az is set at a length that is no shorter than the shortest length out of the innermost unit convex lengths in the ring-shaped regions A1 to A4, and the outermost unit convex length in the ring-shaped region Az is set at a length that is no greater than the longest length out of the outermost unit convex lengths in the ring-shaped regions A1 to A4. The innermost unit concave length in the ring-shaped region Az is set at a length that is no shorter than the shortest length out of the innermost unit concave lengths in the ring-shaped regions A1 to A4 and the outermost unit concave length in the ring-shaped region Az is set at a length that is no greater than the longest length out of the outermost unit concave lengths in the ring-shaped regions A1 to A4. More specifically, as one example, in the innermost ring-shaped region Az, the outermost unit convex length and the outermost unit concave length are set equal to the outermost unit convex length and the outermost unit concave length in the ring-shaped regions A1 to A4 at 60.00 nm and the innermost unit convex length and the innermost unit concave length are set longer than the innermost unit convex length and the innermost unit concave length in the ring-shaped regions A1 to A4 at 56.55 nm.

A value (5.83) produced by dividing the average (58.28 nm) of the unit convex length in the ring-shaped region Az and the average (58.28 nm) of the unit concave length by the distance (10.00 mm) from the center O is greater than a value (5.18) produced by dividing the average (55.00 nm) of the unit convex length and the average (55.00 nm) of the unit concave length in the ring-shaped region A1 in the outer periphery of the ring-shaped region Az by the distance (10.61 mm) from the center O. Note that as one example, the values used as the unit convex length and the unit concave length in the respective ring-shaped regions A are lengths along the direction of rotation of the convexes 21s and the concaves 22s in the formation regions of the preamble pattern in the servo pattern regions As.

In this way, on the magnetic disk 10, the difference between the longest unit convex length in all of the ring-shaped regions Az, A1 to A4 (in this example, the outermost unit convex length in the respective ring-shaped regions Az, A1 to A4, which is 60.00 nm) and the shortest unit convex length in all of the ring-shaped regions Az, A1 to A4 (in this example, the innermost unit convex length in the respective ring-shaped regions A1 to A4, which is 50.00 nm) is extremely small at 10.00 nm. In the same way, on the magnetic disk 10, the difference between the longest unit concave length in all of the ring-shaped regions Az, A1 to A4 (in this example, the outermost unit concave length in the respective ring-shaped regions Az, A1 to A4, which is 60.00 nm) and the shortest unit concave length in all of the ring-shaped regions Az, A1 to A4 (in this example, the innermost unit concave length in the respective ring-shaped regions A1 to A4, which is 50.00 nm) is extremely small at 10.00 nm.

On the other hand, the spindle motor 2 rotates the magnetic disk 10a at a fixed rotational velocity, such as 3600 rpm, under the control of the control unit 8. As shown in FIG. 1, the magnetic head 3 is attached to an actuator 3b via a swing arm 3a and is moved above the magnetic disk 10 during the recording and reproducing of recording data on the magnetic disk 10. Also, the magnetic head 3 carries out reads of servo data from the servo pattern region As in each ring-shaped region A of the magnetic disk 10, magnetic writes of recording data in the data track pattern regions At (the convexes 21t) in each ring-shaped region A, and reads of recording data that has been magnetically written in the data track pattern regions At in each ring-shaped region A. It should be noted that although an actual magnetic head 3 is formed on a base surface (air bearing surface) of a slider that causes the magnetic head 3 to fly above the magnetic disk 10, the slider has been omitted from this specification and the drawings. The actuator 3b swings the swing arm 3a according to a driving current supplied from the driver 7 under the control of the control unit 8 and thereby moves the magnetic head 3 to an arbitrary recording/reproducing position above the magnetic disk 10.

The signal converting unit 4 includes an amplifier, a low pass filter (LPF), an A/D converter, and the like (not shown), amplifies various signals obtained by the magnetic head 3 from the magnetic disk 10, removes noise, and then carries out an A/D conversion and outputs digital data. The ROM 9 stores clock data Dc1 about read frequency information to be outputted by the control unit 8 for each ring-shaped region A. Here, as described later, based on the clock data Dc1, as one example the control unit 8 changes the frequency of the read frequency information so that the frequency increases as the distance from the center O of the concave/convex patterns 20t to a recording track in a ring-shaped region to which the magnetic head 3 is to be made on-track increases, but does not change the frequency within the same ring-shaped region A. The control unit 8 outputs the resulting read frequency information to the detection clock output unit 5. The detection clock output unit 5 obtains the read frequency information outputted by the control unit 8 based on the clock data Dc1 and obtains (detects), out of the digital data outputted from the signal converting unit 4, data (a signal) of a preamble read via the magnetic head 3 from the servo pattern regions As of the respective ring-shaped regions A. In addition, based on the read frequency information and the preamble data, the detection clock output unit 5 adjusts the phase, frequency, and the like to generate a detection clock C1s to be used when actually detecting the servo data and outputs the detection clock C1s to the servo data detecting unit 6.

Here, on the magnetic disk 10, as described earlier, the concave/convex patterns 20s are formed in the servo pattern regions As so that the innermost unit convex length and the innermost unit concave length in the ring-shaped regions A1 to A4 are equal and the outermost unit convex length and the outermost unit concave length in the ring-shaped regions A1 to A4 are equal (i.e., so that the outermost unit convex length and the outermost unit concave length in the ring-shaped region Az are equal to the outermost unit convex length and the outermost unit concave length in the ring-shaped regions A1 to A4). This means that when the magnetic disk 10 is rotated at a fixed angular velocity, the time taken for the convexes 21s with the unit convex length and the concaves 22s with the unit concave length to pass below the magnetic head 3 decreases from ring-shaped regions A in the inner periphery to ring-shaped regions A in the outer periphery of the magnetic disk 10. Accordingly, in a state where the magnetic disk 10 is being rotated at a fixed velocity of around 3600 rpm, for example, when the magnetic head 3 is made on-track to a recording track (a convex 21t) in the ring-shaped region Az, the control unit 8 outputs read frequency information of 33.3 MHz, when the magnetic head 3 is made on-track to a recording track in the ring-shaped region A1, the control unit 8 outputs read frequency information of 40.0 MHz, when the magnetic head 3 is made on-track to a recording track in the ring-shaped region A2, the control unit 8 outputs read frequency information of 48.0 MHz, when the magnetic head 3 is made on-track to a recording track in the ring-shaped region A3, the control unit 8 outputs read frequency information of 57.6 MHz, and when the magnetic head 3 is made on-track to a recording track in the ring-shaped region A4, the control unit 8 outputs read frequency information of 69.1 MHz.

The servo data detecting unit 6 carries out a read in synchronization with the detection clock C1s outputted from the detection clock output unit 5 to obtain (detect) servo data Ds from the digital data outputted from the signal converting unit 4 and outputs the servo data Ds to the control unit 8. The driver 7 controls the actuator 3b in accordance with a control signal from the control unit 8 so that the magnetic head 3 is made on-track to a desired recording track (a convex 21t). The control unit 8 carries out overall control of the hard disk drive 1. The control unit 8 specifies, based on head position information outputted from the servo data detecting unit 6, a ring-shaped region A, out of the ring-shaped region Az in the inner periphery to the ring-shaped region A4 in the outer periphery on the magnetic disk 10, that includes the recording track where the magnetic head 3 is made on-track, changes the frequency of the read frequency information as described earlier in accordance with the desired position of the magnetic head 3 (the position of a ring-shaped region A and a recording track to which the magnetic head 3 is to be moved) and the clock data Dc1 (data on frequency converting conditions) which is set in advance for each ring-shaped region A and stored in the ROM 9, and outputs the read frequency information to the detection clock output unit 5. The control unit 8 also controls the driver 7 based on the servo data Ds outputted from the servo data detecting unit 6.

Next, the method of manufacturing and the method of using the magnetic disk 10 will be described with reference to the drawings.

Figure 10:
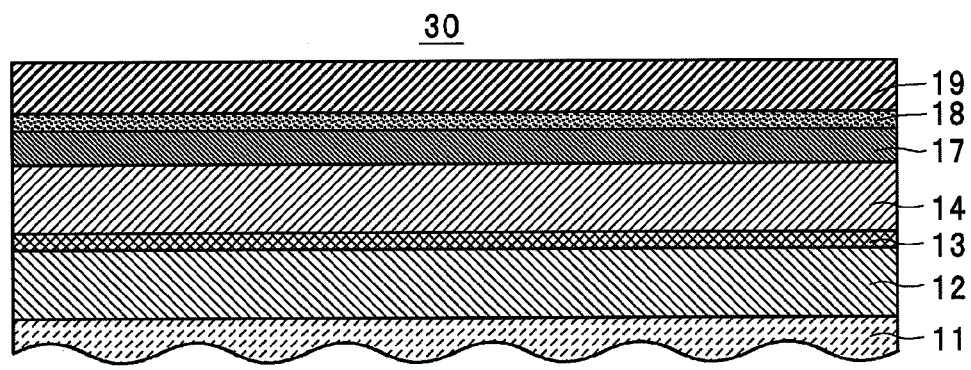
FIG. 10 is a cross-sectional view of a preform for manufacturing the magnetic disk shown in FIG. 3.

First, after the soft magnetic layer 12 is formed by sputtering CoZrNb alloy on the glass base plate 11, the intermediate layer 13 is formed by sputtering an intermediate layer forming material on the soft magnetic layer 12. Next, by sputtering CoCrPt alloy on the intermediate layer 13, the magnetic layer 14 is formed with a thickness of around 15 nm. After this, a C (carbon) mask layer 17 is formed on the magnetic layer 14 with a thickness of around 12 nm by sputtering, for example, and an Si mask layer 18 is formed on the C mask layer 17 with a thickness of around 4 nm by sputtering. Next, a positive electron beam resist is spin coated on the Si mask layer 18 to form a resin layer 19 (mask forming functional layer) with a thickness of around 130 nm. By doing so, as shown in FIG. 10, a preform 30 for manufacturing the magnetic disk 10 is completed. After this, concave/convex patterns 41 are formed in the resin layer 19 of the preform 30 by imprinting using a stamper 35 (see FIG. 16) that is one example of a "stamper" for the present invention.

Figure 16:
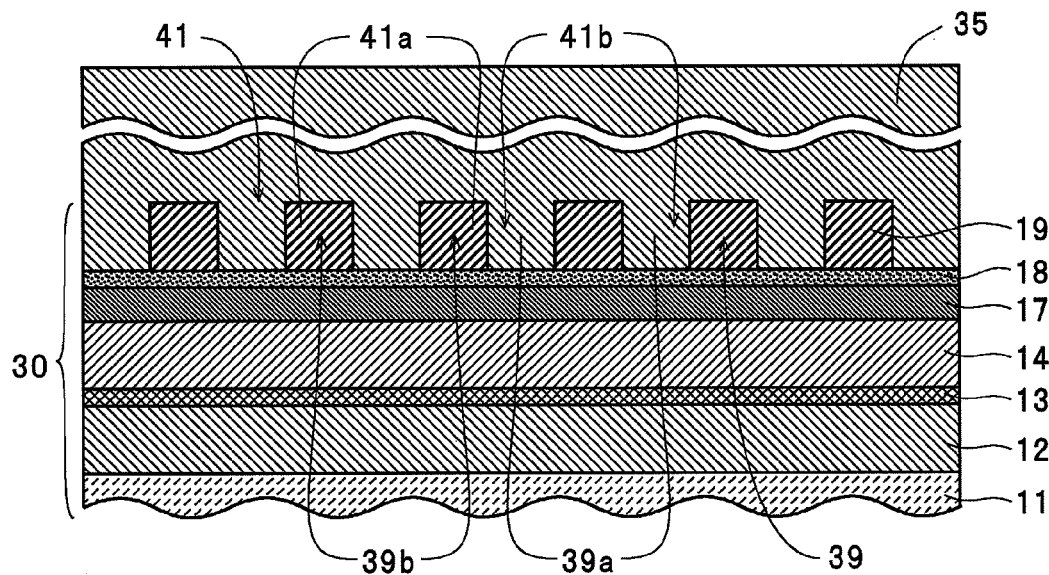
FIG. 16 is a cross-sectional view of the preform and the stamper in a state where the concave/convex patterns of the stamper are pressed into the resin layer (i.e., where the convexes are pressed into the resin layer)

In this case, as shown in FIG. 16, concave/convex patterns 39 where the positional relationship of the concaves and convexes is the reverse of the concave/convex patterns 20 (the concave/convex patterns 20t, 20s) of the magnetic disk 10 are formed on the stamper 35. It should be noted that the concave/convex patterns 39 of the stamper 35 are formed so that convexes 39a correspond to the concaves 22 in the concave/convex patterns 20 of the magnetic disk 10 and concaves 39b correspond to the convexes 21 of the concave/convex patterns 20. Accordingly, on the stamper 35, the length along the direction of rotation of the convexes 39a is substantially equal to the length along the direction of rotation of the concaves 22 in the concave/convex patterns 20, and the length along the direction of rotation of the concaves 39b is substantially equal to the length along the direction of rotation of the convexes 21 in the concave/convex patterns 20.

Also, on the stamper 35, the concaves 39b and the convexes 39a in the concave/convex patterns 39 that correspond to the concave/convex patterns 20t (i.e., the data track patterns) on the magnetic disk 10 are formed in concentric circles or spirals. In addition, on the stamper 35, positions in the concave/convex patterns 39 that correspond to concave/convex patterns 20t, 20s (the data track patterns and the servo patterns) on the magnetic disk 10 are divided into five ring-shaped regions that are concentric with the concave/convex patterns 20t (concaves 39b and convexes 39a that are formed in concentric circles or in a spiral) corresponding to the ring-shaped regions Az, A1 to A4 of the magnetic disk 10. In this case, out of the ring-shaped regions described above, the respective lengths along the radial direction of the ring-shaped regions corresponding to the ring-shaped regions A1 to A4 of the magnetic disk 10 (the ring-shaped regions A out of all of the ring-shaped regions A aside from one or both of the innermost ring-shaped region A and the outermost ring-shaped region A: in this example, all of the ring-shaped regions A aside from the innermost ring-shaped region Az: the "first ring-shaped regions" for the present invention) are set so as to increase toward the outer periphery of the stamper 35 corresponding to the lengths in the radial direction of the ring-shaped regions A1 to A4 of the magnetic disk 10.

Also, on the stamper 35, the ratio of the "length in the radial direction of the ring-shaped region corresponding to the ring-shaped region A2 on the magnetic disk 10" to the "length in the radial direction of the ring-shaped region corresponding to the ring-shaped region A1", the ratio of the "length in the radial direction of the ring-shaped region corresponding to the ring-shaped region A3" to the "length in the radial direction of the ring-shaped region corresponding to the ring-shaped region A2", and the ratio of the "length in the radial direction of the ring-shaped region corresponding to the ring-shaped region A4" to the "length in the radial direction of the ring-shaped region corresponding to the ring-shaped region A3" are all equal. On the stamper 35, in the respective ring-shaped regions described above, the "length of the concaves 39b corresponding to the unit convex length on the magnetic disk 10" and the "length of the convexes 39a corresponding to the unit concave length on the magnetic disk 10" increase from the inner periphery of a ring-shaped region toward the outer periphery of the ring-shaped region in proportion to the distance from the center of the patterns corresponding to the concave/convex patterns 20t.

Also on the stamper 35, "the length of the concaves 39b corresponding to the unit convex length" and the "length of the convexes 39a corresponding to the unit concave length" in each ring-shaped region are set so that a value produced by dividing "the average length in each ring-shaped region of the concaves 39b corresponding to the unit convex length on the magnetic disk 10" by the distance from the center of the pattern corresponding to the concave/convex pattern 20t to the ring-shaped region and a value produced by dividing "the average length in each ring-shaped region of the convexes 39a corresponding to the unit concave length on the magnetic disk 10" by the distance from the center of the pattern corresponding to the concave/convex pattern 20t to the ring-shaped region both decrease from an inner periphery ring-shaped region to the outer periphery ring-shaped region. In addition, on the stamper 35, in every ring-shaped region corresponding to the ring-shaped regions A1 to A4 out of the ring-shaped regions described above, the "length of the concaves 39b corresponding to the unit convex length" is set so that the ratio of "the length of the concaves 39b corresponding to the unit convex length" in the outermost periphery of a ring-shaped region to "the length of the concaves 39b corresponding to the unit convex length" in the innermost periphery of the ring-shaped region is the same, and the "length of the convexes 39a corresponding to the unit concave length" is set so that the ratio of "the length of the convexes 39a corresponding to the unit concave length" in the outermost periphery of a ring-shaped region to "the length of the convexes 39a corresponding to the unit concave length" in the innermost periphery of the ring-shaped region is the same.

In addition, on the stamper 35, in every ring-shaped region corresponding to the ring-shaped regions A1 to A4 out of the ring-shaped regions described above, the "length of the concaves 39b corresponding to the unit convex length" is set so that the "length of the concaves 39b corresponding to the unit convex length" in the outermost periphery of each ring-shaped region is equal and the "length of the convexes 39a corresponding to the unit concave length" is set so that the "length of the convexes 39a corresponding to the unit concave length" in the outermost periphery of each ring-shaped region is equal. Also, on the stamper 35, in every ring-shaped region corresponding to the ring-shaped regions A1 to A4 out of the ring-shaped regions described above, the "length of the concaves 39b corresponding to the unit convex length" is set so that the "length of the concaves 39b corresponding to the unit convex length" in the innermost periphery of each ring-shaped region is equal and the "length of the convexes 39a corresponding to the unit concave length" is set so that the "length of the convexes 39a corresponding to the unit concave length" in the innermost periphery of each ring-shaped region is equal.

On the stamper 35, the "length of the concaves 39b corresponding to the unit convex length" is set so that the "length of the concaves 39b corresponding to the unit convex length" in the innermost periphery of the ring-shaped region corresponding to the ring-shaped region Az out of the ring-shaped regions described above is "a length no shorter than the shortest length out of the lengths of the concaves 39b corresponding to the unit convex length" in the innermost periphery of the ring-shaped regions corresponding to the ring-shaped regions A1 to A4 and the "length of the concaves 39b corresponding to the unit convex length" in the outermost periphery of the ring-shaped region corresponding to the ring-shaped region Az is "a length no greater than the longest length out of the lengths of the concaves 39b corresponding to the unit convex length" in the outermost periphery of the ring-shaped regions corresponding to the ring-shaped regions A1 to A4. In addition, on the stamper 35, the "length of the convexes 39a corresponding to the unit concave length" is set so that the "length of the convexes 39a corresponding to the unit concave length" in the innermost periphery of the ring-shaped region corresponding to the ring-shaped region Az out of the ring-shaped regions described above is "a length no shorter than the shortest length out of the lengths of the convexes 39a corresponding to the unit concave length" in the innermost periphery of the ring-shaped regions corresponding to the ring-shaped regions A1 to A4 and the "length of the convexes 39a corresponding to the unit concave length" in the outermost periphery of the ring-shaped region corresponding to the ring-shaped region Az is "a length no greater than the longest length out of the lengths of the convexes 39a corresponding to the unit concave length" in the outermost periphery of the ring-shaped regions corresponding to the ring-shaped regions A1 to A4. It should be noted that there are no particular limitations regarding the method of manufacturing the stamper 35, and the stamper 35 can be manufactured according to a variety of known methods.

When the magnetic disk 10 is manufactured using the stamper 35, as shown in FIG. 16, first the concave/convex patterns 39 of the stamper 35 are transferred to the resin layer 19 of the preform 30 by imprinting. More specifically, by pressing the surface of the stamper 35 on which the concave/convex patterns 39 are formed into the resin layer 19 of the preform 30, the convexes 39a of the concave/convex patterns 39 are pressed into the resin layer 19 of the preform 30.

When doing so, on the magnetic disk 10 manufactured using the stamper 35, as described earlier, since the unit concave length in the innermost periphery of the respective ring-shaped regions A1 to A4 is equal and the unit concave length in the outermost periphery of the respective ring-shaped regions A1 to A4 is also equal, the difference between the innermost unit concave length and the outermost unit concave length in the ring-shaped regions A1 to A4 is extremely small. Also, on the magnetic disk 10 manufactured using the stamper 35, in the innermost ring-shaped region Az, the outermost unit convex length and the outermost unit concave length are set equal to the outermost unit convex length and the outermost unit concave length in the ring-shaped regions A1 to A4. Accordingly, on the stamper 35 with the concave/convex patterns 39 corresponding to the concave/convex patterns 20 of the magnetic disk 10, the difference between the longest length and the shortest length out of the lengths along the direction of rotation of the convexes 39a is extremely small. This means that by pressing the stamper 35 into the resin layer 19 with substantially uniform force across the entire stamper 35, the convexes 39a of the stamper 35 will be pressed substantially uniformly into the resin layer 19. By doing so, it is possible to avoid a situation where thick residue is produced only at some positions where the convexes 39a are pressed in.

Figure 12:
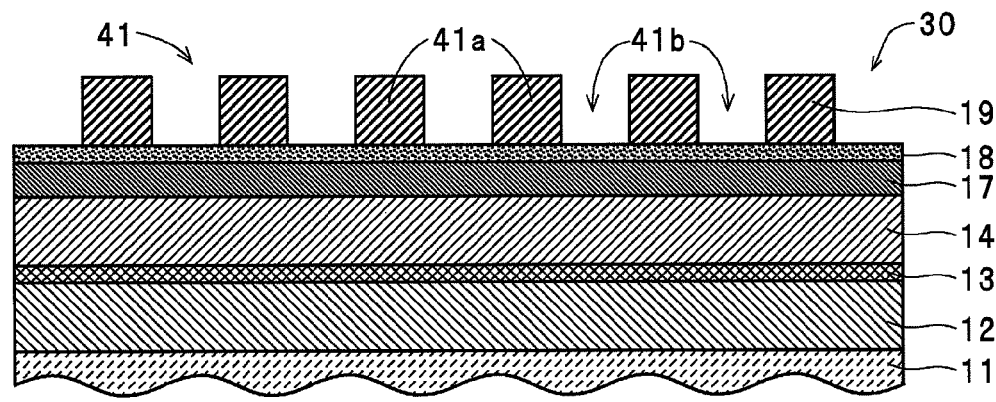
FIG. 12 is a cross-sectional view of a preform in a state where concave/convex patterns of a stamper are transferred to the resin layer or where the resin layer of the preform shown in FIG. 11 is developed.

Next, the stamper 35 is separated from the preform 30 and resin (residue: not shown) remaining in the bottom surfaces are removed by an oxygen plasma process. By doing so, as shown in FIG. 12, the concave/convex patterns 41 are formed on the Si mask layer 18 of the preform 30. When doing so, as described above, since the thickness of the residue is substantially uniform at the positions where the convexes 39a are pressed in, by carrying out the oxygen plasma process with the same conditions across the entire preform 30, the removal of the residue will be completed across the entire preform 30 within substantially the same processing time. By doing so, since it is possible to avoid a situation where corrosion occurs for the inner wall surfaces of concaves 42b at only some of the positions where the convexes 39a are pressed in and the length (open length) along the direction of rotation of such concaves 42b widens, the concaves 42b can be formed with the desired open widths.

Figure 13:
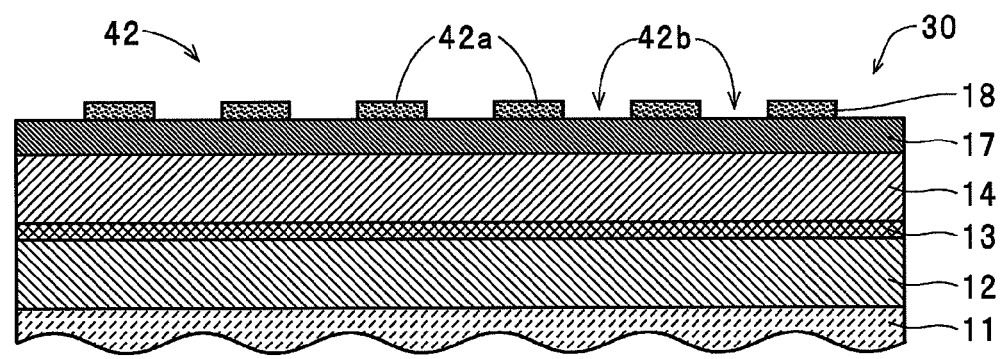
FIG. 13 is a cross-sectional view of the preform in a state where an Si mask layer is etched with concave/convex patterns as a mask to form concave/convex patterns (an Si mask) on a C mask layer.
Figure 14:
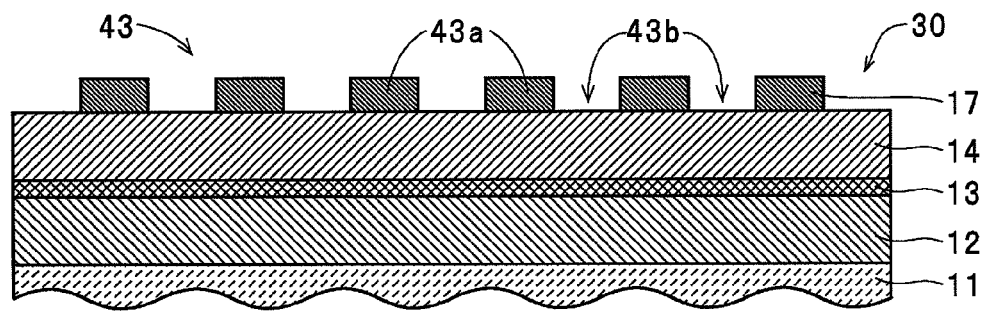
FIG. 14 is a cross-sectional view of the preform in a state where the C mask layer is etched with the concave/convex patterns as a mask to form concave/convex patterns (a C mask) on a magnetic layer.

Next, by carrying out ion beam etching with argon (Ar) gas using the concave/convex patterns 41 (the resin layer 19) as a mask, the Si mask layer 18 exposed from the mask (convexes 41a) at the bottoms of the concaves 41b in the concave/convex patterns 41 is etched to form concave/convex patterns 42 (an Si mask pattern) in the Si mask layer 18 as shown in FIG. 13. After this, reactive ion etching is carried out with oxygen gas as the reactive gas and the concave/convex patterns 42 as a mask to etch the C mask layer 17 exposed from the mask (convexes 42a) at the bottoms of the concaves 42b in the concave/convex patterns 42 to form concave/convex patterns 43 (a C mask pattern) in the C mask layer 17 as shown in FIG. 14. When doing so, as described above, since the concaves 42b of the concave/convex patterns 42 are formed with the desired open widths, the concaves 43b in the concave/convex patterns 43 formed using the concave/convex patterns 42 are also formed with the desired open widths.

Figure 15:
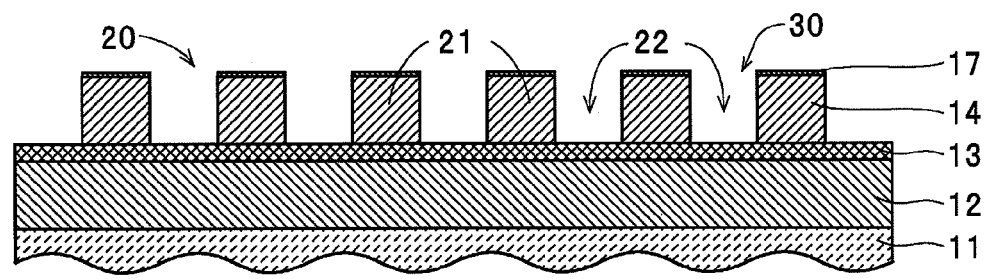
FIG. 15 is a cross-sectional view of the preform in a state where the magnetic layer is etched with the concave/convex patterns as a mask to form concave/convex patterns on an intermediate layer.

Next, ion beam etching is carried out using argon (Ar) gas and the concave/convex patterns 43 as a mask. By doing so, as shown in FIG. 15, the positions in the magnetic layer 14 that were covered by the mask pattern (positions covered by convexes 43a of the concave/convex patterns 43) become the convexes 21 and positions exposed from the mask pattern (positions that were exposed at the bottoms of the concaves 43b of the concave/convex patterns 43) become the concaves 22, thereby forming the concave/convex patterns 20 (the concave/convex patterns 20s and 20t) on the intermediate layer 13. When doing so, as described above, since the concaves 43b in the concave/convex patterns 43 are formed with the desired open widths, the concaves 22 in the concave/convex patterns 20 formed using the concave/convex patterns 43 will be formed with the desired open widths.

Also, as described above, on the magnetic disk 10, the difference between the length L6i of the innermost concaves 22si of the respective ring-shaped regions A1 to A4 and the length L6o of the outermost concaves 22so of the respective ring-shaped regions A1 to A4 is extremely small, and the average length of the concaves 22s in the respective ring-shaped regions A1 to A4 is set equal in the entire range of the ring-shaped regions A1 to A4. Also, in the ring-shaped region Az that is inside the ring-shaped region A1, the length (unit concave length) of the outermost concaves 22so is equal to the length (unit concave length) of the outermost concaves 22so in the ring-shaped regions A1 to A4 and the length (unit concave length) of the innermost concaves 22si in the ring-shaped region Az is no smaller than the length of the innermost concaves 22si in the ring-shaped regions A1 to A4 and no greater than the length of the outermost concaves 22so in the ring-shaped regions A1 to A4. Accordingly, the concaves 22s can be formed with a substantially equal depth without large fluctuations in the depth. Next, by carrying out reactive ion etching on the C mask layer 17 (the C mask pattern) remaining on the convexes 21 with oxygen gas as the reactive gas, the upper surfaces of the convexes 21 are exposed (the remaining C mask layer 17 is removed).

Next, while a bias power of around 150 W for example is applied to the preform 30, $SiO_2$ as the non-magnetic material 15 is sputtered with the pressure of the argon (Ar) gas set at 0.3 Pa, for example. At this time, a sufficient amount of the non-magnetic material 15 is sputtered to completely fill the concaves 22 with the non-magnetic material 15 and form a layer of non-magnetic material 15 with a thickness of around 60 nm, for example, on the upper surfaces of the convexes 21. Here, by sputtering the non-magnetic material 15 in a state where bias power is applied to the preform 30, a layer of non-magnetic material 15 is formed without producing large convexes and concaves on the surface. Next, ion beam etching is carried out on the layer of the non-magnetic material 15 on the magnetic layer 14 (i.e., on the convexes 21, on the concaves 22, and inside the concaves 22) in a state where the pressure of the argon (Ar) gas is set at 0.04 Pa, for example, and where the incident angle of the ion beam on the surface of the preform 30 (the layer of the non-magnetic material 15) is set at 2°.

Here, as described above, on the magnetic disk 10, the difference between the length L5i of the innermost convexes 21si of the respective ring-shaped regions A1 to A4 and the length L5o of the outermost convexes 21so of the ring-shaped regions A1 to A4 is extremely small, and the average length of the convexes 21s in the respective ring-shaped regions A1 to A4 is set equal across the entire range of the ring-shaped regions A1 to A4. Also, in the ring-shaped region Az that is inside the ring-shaped region A1, the length (unit convex length) of the outermost convexes 21so is equal to the length (unit convex length) of the outermost convexes 21so in the ring-shaped regions A1 to A4 and the length (unit convex length) of the innermost convexes 21si in the ring-shaped region Az is no smaller than the length of the innermost convexes 21si in the ring-shaped regions A1 to A4 and no greater than the length of the outermost convexes 21so in the ring-shaped regions A1 to A4.

Accordingly, during the ion beam etching of the non-magnetic material 15, as one example, by continuing the ion beam etching until the upper surfaces of the convexes 21so in the outer periphery of the ring-shaped region A1 are exposed from the non-magnetic material 15, the upper surfaces of the convexes 21si inside the ring-shaped region A1 will become exposed from the non-magnetic material 15, and in the ring-shaped regions A2 to A4 outside the ring-shaped region A1 and the ring-shaped region Az inside the ring-shaped region A1 also, the upper surfaces of the convexes 21so in the outer periphery and the upper surfaces of the convexes 21si in the inner periphery will become exposed from the non-magnetic material 15. In other words, in each ring-shaped region A from the inner periphery to the outer periphery, all of the convexes 21s from the inner periphery to the outer periphery will become exposed from the non-magnetic material 15 at substantially the same time.

For this reason, when manufacturing the magnetic disk 10, by etching the non-magnetic material 15 with the etching conditions described above, the removal of the residue (the non-magnetic material 15) from above the convexes 21s across every ring-shaped region A will be completed in substantially the same processing time. By doing so, the ion beam etching of the layer of the non-magnetic material 15 is completed and the surface of the preform 30 is made smooth. Next, after the protective layer 16 is formed by forming a thin film of diamond-like carbon (DLC) by CVD so as to cover the surface of the preform 30, a fluorine lubricant is applied to the surface of the protective layer 16 so that the average thickness is around 2 nm, for example. By doing so, the magnetic disk 10 is completed as shown in FIG. 2.

On the magnetic disk 10, as described above, since the residue (non-magnetic material 15) on the respective convexes 21s is removed across the entire magnetic disk 10 (i.e., in every ring-shaped region A), the difference in height between the concaves and convexes on the surface of the magnetic disk 10 (in each ring-shaped region A, the difference in height Hi at the inner periphery and the difference in height Ho at the outer periphery: see FIGS. 7 and 9) becomes substantially uniform across the entire magnetic disk 10 (i.e., in every ring-shaped region A). More specifically, the degree of unevenness, that is, the surface roughness Ra of the surface of the magnetic disk 10 in an inner-periphery servo pattern region Asi in the ring-shaped region A1 for example is around 0.7 nm and the surface roughness Ra of the magnetic disk 10a in an outer-periphery servo pattern region Aso in the ring-shaped region A1 is around 0.8 nm. In the other ring-shaped regions A also, the surface roughness Ra of the inner-periphery servo pattern region Asi and the surface roughness Ra of the outer-periphery servo pattern region Aso are around 0.7 nm to 0.8 nm. Accordingly, the flying height of the magnetic head 3 (the slider) becomes substantially constant in every ring-shaped region A from the inner periphery to the outer periphery of the magnetic disk 10, and therefore stabilized recording and reproducing are possible. Note that on a magnetic disk 10 with the surface roughness Ra measured above, as one example, address patterns and the like are recorded inside each servo pattern region As using convexes 21s whose length along the direction of rotation is the unit convex length, convexes 21s whose length along the direction of rotation is twice the unit convex length, concaves 22s whose open length along the direction of rotation is the unit concave length, and concaves 22s whose open length along the direction of rotation is twice the unit concave length.

In addition, according to the hard disk drive 1 equipped with the magnetic disk 10, the control unit 8 controls the servo data detecting unit 6 to read the servo data Ds associated with the servo patterns from the magnetic disk 10 based on read frequency information set in advance for each ring-shaped region A. Accordingly, when carrying out a seek operation for the magnetic head 3 from the ring-shaped region Az in the inner periphery of the magnetic disk 10 to the ring-shaped region A4 in the outer periphery, for example, the number of frequency switching processes for the read frequency information can be suppressed to only four. Since seek operations can be carried out in a short time, data can be accessed at high speed. Also, since it is sufficient to output a number of types of frequency information corresponding to the number of the ring-shaped regions A (in this example, five) as the read frequency information, a tracking servo can be carried out by a control unit (the detection clock output unit 5 and the control unit 8) with a simple construction.

Here, on the hard disk drive 1, when the magnetic head 3 is positioned in one out of the ring-shaped regions A but is to be moved to another ring-shaped region A, the control unit 8 first specifies the recording track where the magnetic head 3 is positioned and the recording track to which the magnetic head 3 is to be moved and calculates the distance to be moved for the magnetic head 3. When doing so, the control unit 8 calculates the distance described above based on the track pitch of the recording tracks on the magnetic disk 10 and the number of tracks to be moved for the magnetic head 3 (i.e., the number of tracks to be crossed by the magnetic head 3). After this, the control unit 8 specifies the VCM driving current that is necessary to move the magnetic head 3 by the desired distance in accordance with a driving current profile table set in advance and controls the driver 7 to output the specified VCM driving current to the actuator 3b. By doing so, an actuator 3b swings a swing arm 3a by a predetermined amount to move the magnetic head 3 to a predetermined recording track. When doing so, the control unit 8 controls the detection clock output unit 5 to output a detection clock C1s corresponding to the ring-shaped region A to which the magnetic head 3 has moved to the servo data detecting unit 6. By doing so, the servo data Ds is read in the moved-to ring-shaped region A based on the detection clock C1s.

In this way, on the magnetic disk 10, the unit convex length and the unit concave length are set in each ring-shaped region A so that the unit convex length (the length along the direction of rotation of the convexes 21s) and the unit concave length (the length along the direction of rotation of the concaves 22) increase within a ring-shaped region A from the inner periphery of the ring-shaped region A toward the outer periphery of the ring-shaped region A in proportion to the distance from the center O of the data track patterns and so that a value produced by dividing an average of the unit convex length in each ring-shaped region A by the distance from the center O of the data track patterns to the ring-shaped region A and a value produced by dividing an average of the unit concave length in each ring-shaped region A by the distance from the center O of the data track patterns to the ring-shaped region A decrease from a ring-shaped region A in the inner periphery to a ring-shaped region A in the outer periphery. In addition, the respective lengths L1 to L4 along the radial direction of the ring-shaped regions A1 to A4 ("first ring-shaped regions") are set so as to increase from an inner-periphery ring-shaped region A toward an outer-periphery ring-shaped region A.

Also, on the magnetic disk 10, the unit convex length and the unit concave length are set in each ring-shaped region A so that the unit convex length (the length along the direction of rotation of the convexes 21s) and the unit concave length (the length along the direction of rotation of the concaves 22) increase within a ring-shaped region A from the inner periphery of the ring-shaped region A to the outer periphery of the ring-shaped region A in proportion to the distance from the center O of the data track patterns and so that a value produced by dividing an average of the unit convex length in each ring-shaped region A by the distance from the center O of the data track patterns to the ring-shaped region A and a value produced by dividing an average of the unit concave length in each ring-shaped region A by the distance from the center O of the data track patterns to the ring-shaped region A decrease from a ring-shaped region A in the inner periphery to a ring-shaped region A in the outer periphery. In addition, the respective lengths L1 to L4 along the radial direction of the ring-shaped regions A1 to A4 ("first ring-shaped regions") are set so as to increase from an inner-periphery ring-shaped region A toward an outer-periphery ring-shaped region A. In the ring-shaped region Az (the "second ring-shaped region"), the unit convex lengths are set so that the innermost unit convex length in the ring-shaped region Az is no shorter than the shortest length out of the innermost unit convex lengths in the ring-shaped regions A1 to A4 and the outermost unit convex length in the ring-shaped region Az is no greater than the longest length out of the outermost unit convex lengths in the ring-shaped regions A1 to A4, and the unit concave lengths are set so that the innermost unit concave length in the ring-shaped region Az is no shorter than the shortest length out of the innermost unit concave lengths in the ring-shaped regions A1 to A4 and the outermost unit concave length in the ring-shaped region Az is no greater than the longest length out of the outermost unit concave lengths in the ring-shaped regions A1 to A4.

The hard disk drive 1 includes the magnetic disk 10 described above and the control unit 8 that carries out servo control based on servo data associated with the servo patterns.

Therefore, according to the magnetic disk 10 and the hard disk drive 1, compared to the magnetic disk 10ax, where there is a tendency for the innermost unit convex length and the innermost unit concave length in the ring-shaped region Ax in the inner periphery to be shorter than the unit convex length and the unit concave length at other positions, and the magnetic disk 10bx, where there is a tendency for the outermost unit convex length and the outermost unit concave length in the ring-shaped region Ax in the inner periphery to be longer than the unit convex length and the unit concave length at other positions, due to the lengths Lx in the radial direction of the respective ring-shaped regions Ax being equal, the difference between the shortest unit convex length out of the entire range from the ring-shaped region A1 in the inner periphery to the ring-shaped region A4 in the outer periphery and the longest unit convex length out of the entire range from the ring-shaped region A1 to the ring-shaped region A4 can be sufficiently reduced, and the difference between the shortest unit concave length out of the entire range from the ring-shaped region A1 to the ring-shaped region A4 and the longest unit convex length out of the entire range from the ring-shaped region A1 to the ring-shaped region A4 can be sufficiently reduced.

This means that according to the magnetic disk 10 and the hard disk drive 1, since it is possible to press the convexes 39a of the stamper 35 into the resin layer 19 used to form a mask pattern substantially uniformly across the entire stamper 35 when manufacturing the magnetic disk 10 by imprinting, it is possible to avoid a situation where the open lengths of any of the concaves 41b become different to the desired open lengths during the removal of residue. Therefore, according to the magnetic disk 10 and the hard disk drive 1, since it is possible to manufacture the magnetic disk 10 using the concave/convex patterns 41 (a mask pattern) with concaves 41b with the desired open lengths, it is possible to set the open length of the concaves 22s in the servo patterns (concave/convex patterns 20s) at the desired open lengths, and as a result it will be possible to properly read the servo data.

According to the magnetic disk 10 and the hard disk drive 1, when forming the concave/convex patterns 20 (the concave/convex patterns 20s, 20t) by etching using the concave/convex patterns 43 as a mask, it will be possible to sufficiently reduce the difference in the width of open surfaces between the concaves 22 with wide open surfaces and the concaves 22 with narrow open surfaces, and therefore it is possible to avoid a situation where any of the formed concaves 22s becomes excessively deep. Also, when etching the layer of non-magnetic material 15 formed so as to cover the convexes 21, it is possible to sufficiently reduce the difference in the width of protruding end surfaces between the convexes 21 with wide protruding end surfaces and the convexes 21 with narrow protruding end surfaces in the concave/convex patterns 20 present below the layer of the non-magnetic material 15, and therefore it is possible to avoid a situation where the difference between the thickness of the residue on the outermost convexes 21s of the ring-shaped region A1 in the inner periphery and the thickness of the residue on the convexes 21s formed at other positions is large. Also, when the non-magnetic material 15 is etched so that residue (the non-magnetic material 15) is not present on the convexes 21s in the entire range from the ring-shaped region A1 in the inner periphery to the ring-shaped region A4 in the outer periphery, it is also possible to remove the residue from above the convexes 21s without creating a situation where there is deterioration in the smoothness and/or where the convexes 21s (the magnetic material) are excessively etched in the inner periphery of the inner-periphery ring-shaped region A1. Accordingly, it is possible to maintain favorable smoothness for the magnetic disk 10 across the entire range of the ring-shaped regions A1 to A4. Since it is possible to keep the flying height of the magnetic head 3 above the magnetic disk 10 substantially equal in the ring-shaped regions A1 to A4, according to the hard disk drive 1 equipped with the magnetic disk 10, it is possible to carry out stabilized recording and reproducing.

In addition, according to the magnetic disk 10 and the hard disk drive 1 where the unit convex length and the unit concave length are set so as to increase in each ring-shaped region A from the inner periphery of the ring-shaped region A toward the outer periphery of the ring-shaped region A in proportion to the distance from the center O, the sum of the unit convex length and the unit concave length (that is, the formation pitch of the convexes 21s and the formation pitch of the concaves 22s) will increase in each ring-shaped region A from the inner periphery to the outer periphery thereof in proportion to the distance from the center O. This means that it will be possible to reliably read (detect) the servo data Ds from the servo pattern regions As across the entire range from the innermost periphery to the outermost periphery of each ring-shaped region A while rotating the magnetic disk 10 with a fixed angular velocity and without changing the frequency information (read frequency information), which is the standard for the clock used when reading the servo data Ds from the servo pattern regions As, within one ring-shaped region A.

Also, according to the magnetic disk 10 and the hard disk drive 1, by setting the unit convex lengths so that the ratio of the unit convex length in the outermost periphery of the ring-shaped regions A1 to A4 to the unit convex length in the innermost periphery of the ring-shaped regions A1 to A4 is equal in all of the ring-shaped regions A1 to A4 and setting the unit concave lengths so that the ratio of the unit concave length in the outermost periphery of the ring-shaped regions A1 to A4 to the unit concave length in the innermost periphery of the ring-shaped regions A1 to A4 is equal in all of the ring-shaped regions A1 to A4, it is possible to avoid fluctuations in smoothness between the ring-shaped regions A1 to A4 and maintain even more favorable smoothness in all of the ring-shaped regions A from the ring-shaped region A1 in the inner periphery to the ring-shaped region A4 in the outer periphery. As a result, across the entire range of the ring-shaped regions A1 to A4, it is possible to achieve more favorable uniformity in the flying height of the magnetic head 3 above the magnetic disk 10.

In addition, according to the magnetic disk 10 and the hard disk drive 1, the unit convex lengths are set so that the outermost unit convex lengths in the ring-shaped regions A1 to A4 are equal in all of the ring-shaped regions A1 to A4 and the unit concave lengths are set so that the outermost unit concave lengths in the ring-shaped regions A1 to A4 are equal in all of the ring-shaped regions A1 to A4. In addition, according to the magnetic disk 10 and the hard disk drive 1, the unit convex lengths are set so that the innermost unit convex lengths of the ring-shaped regions A1 to A4 are equal in all of the ring-shaped regions A1 to A4 and the unit concave lengths are set so that the innermost unit concave lengths in the ring-shaped regions A1 to A4 are equal in all of the ring-shaped regions A1 to A4. Accordingly, according to the magnetic disk 10 and the hard disk drive 1, since the difference between the longest unit convex length in all of the ring-shaped regions A1 to A4 and the shortest unit convex length in all of the ring-shaped regions A1 to A4 can be made significantly smaller and the difference between the longest unit concave length in all of the ring-shaped regions A1 to A4 and the shortest unit concave length in all of the ring-shaped regions A1 to A4 can be made significantly smaller, it is possible to significantly reduce machining fluctuations during the manufacturing of the magnetic disk 10, and as a result, it is possible to significantly improve the smoothness of the magnetic disk 10.

In this way, according to the stamper 35 for manufacturing the magnetic disk 10, by forming the concave/convex patterns 39 with the convexes 39a formed corresponding to the concaves 22 in the concave/convex patterns 20 (the concave/convex patterns 20t, 20s) of the magnetic disk 10 and the concaves 39b formed corresponding to the convexes 21 in the concave/convex patterns 20 of the magnetic disk 10, unlike for example a method of manufacturing that forms the concave/convex patterns 41 by using an electron beam drawing apparatus to draw an exposure pattern with the same planar shape as the concave/convex patterns 20s, 20t on the resin layer 19 of the preform 30 and then developing the exposure pattern, it is possible to easily form the concave/convex patterns 41 in a short time by merely pressing the concave/convex patterns 39 of the stamper 35 into the resin layer 19. It is also possible to form the concave/convex patterns 41 in a large number of preforms 30 using a single stamper 35.

Accordingly, the manufacturing cost of the magnetic disk 10 can be sufficiently reduced. In addition, it is possible to form the concave/convex patterns 42 (the mask pattern for use during etching) in which the concaves 42b are formed with the desired open widths.

Note that the present invention is not limited to the construction described above. For example, although the magnetic disk 10 with the ring-shaped regions A1 to A4 corresponding to "first ring-shaped regions" for the present invention and the ring-shaped region Az (a "second ring-shaped region" for the present invention: in this example a region where the innermost unit convex length and the innermost unit concave length differ to the innermost unit convex length and the innermost unit concave length in the ring-shaped regions A1 to A4) that is not a "first ring-shaped region" for the present invention has been described as an example, the present invention is not limited to this and can also be applied to a construction that does not include a second ring-shaped region for the present invention (the ring-shaped region Az in the example described above) and only has first ring-shaped regions for the present invention (the ring-shaped regions A1 to A4 in the example described above).

For a construction that includes the ring-shaped region Az that corresponds to the second ring-shaped region for the present invention, the position of the ring-shaped region Az is not limited to being on the inside of the ring-shaped regions A1 to A4 as on the magnetic disk 10. More specifically, like a magnetic disk 10a shown in FIG. 18, it is possible to apply the present invention to a construction where a ring-shaped region Az (the second ring-shaped region) that is not a first ring-shaped region for the present invention is provided on the outside (the outermost periphery) of the ring-shaped regions A1 to A4 that correspond to first ring-shaped regions for the present invention. It is also possible to apply the present invention to a construction (not shown) where a ring-shaped region Az (the second ring-shaped region) that is not a first ring-shaped region for the present invention is provided both on the inside and on the outside of the ring-shaped regions A1 to A4 that correspond to first ring-shaped regions for the present invention.

Figure 19:
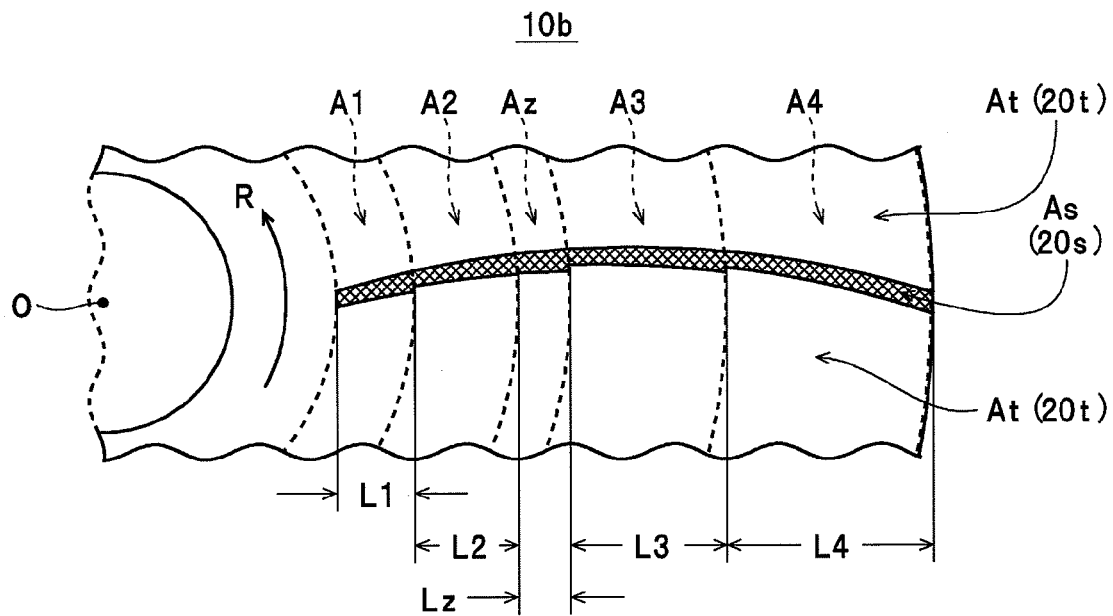
FIG. 19 is a plan view of servo pattern regions on another magnetic disk.

In addition, like a magnetic disk 10b shown in FIG. 19, it is possible to apply the present invention to a construction where a ring-shaped region Az (the second ring-shaped region) that is not a first ring-shaped region for the present invention is provided between the ring-shaped regions A1 to A4 that correspond to first ring-shaped regions for the present invention (in this example, between the ring-shaped region A2 and the ring-shaped region A3). In this way, regardless of the position where the ring-shaped region Az (the second ring-shaped region) that is not a first ring-shaped region for the present invention is provided, by setting the ring-shaped regions A1 to A4 in accordance with the conditions of the information recording medium according to the present invention and setting the unit convex length and the unit concave length in each ring-shaped region A in accordance with the conditions of the information recording medium according to the present invention, it is possible to achieve the same effects as the magnetic disk 10 described above. Note that on the magnetic disks 10a and 10b, components that have the same functions as the magnetic disk 10 described above have been assigned the same reference numerals and duplicated description thereof is omitted.

Figure 20:
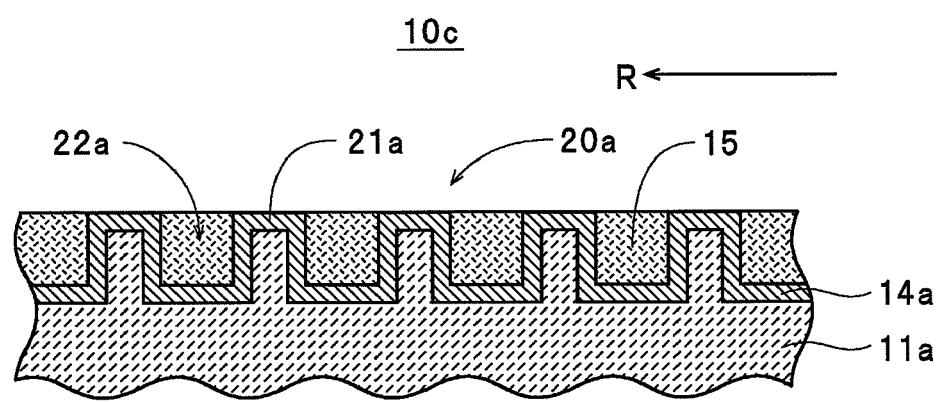
FIG. 20 is a cross-sectional view showing the multilayer structure of another magnetic disk.

Also, although the respective convexes 21 in the concave/convex patterns 20 are formed of magnetic material (recording material) from the bottom ends to the protruding ends thereof on the magnetic disks 10, 10a, and 10b described above, the present invention is not limited to this, and by forming a magnetic layer 14a so as to cover concave/convex patterns formed in a glass base plate 11a as on a magnetic disk 10c shown in FIG. 20, it is possible to construct concave/convex patterns 20a with convexes 21a whose surfaces are formed by a magnetic layer 14a and concaves 22a whose bottom surfaces are also formed by the magnetic layer 14a. In this case, in the same way as the method of forming the concave/convex patterns 20 on the magnetic disk 10 and the like described above, the concave/convex patterns of the glass base plate 11a can be formed by etching the glass base plate 11a using the concave/convex patterns 43 that were used as a mask when etching the magnetic layer 14, for example. The concave/convex patterns of the glass base plate 11a can also be formed by press molding or injection molding using a stamper same as the stamper 35, for example.

Figure 21:
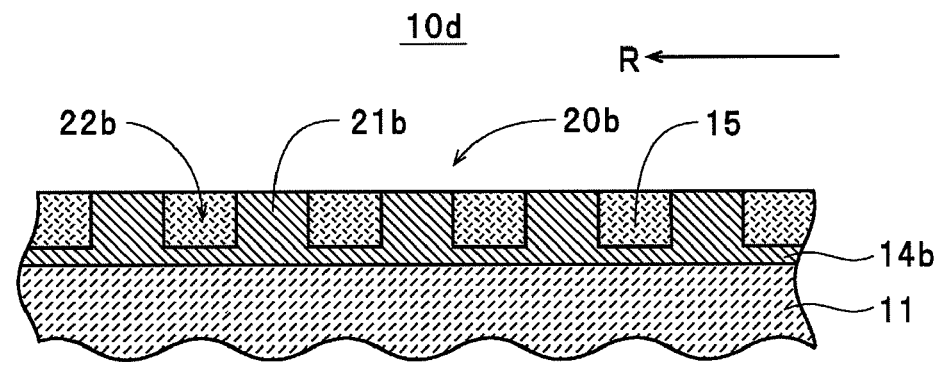
FIG. 21 is a cross-sectional view showing the multilayer structure of another magnetic disk.
Figure 2:
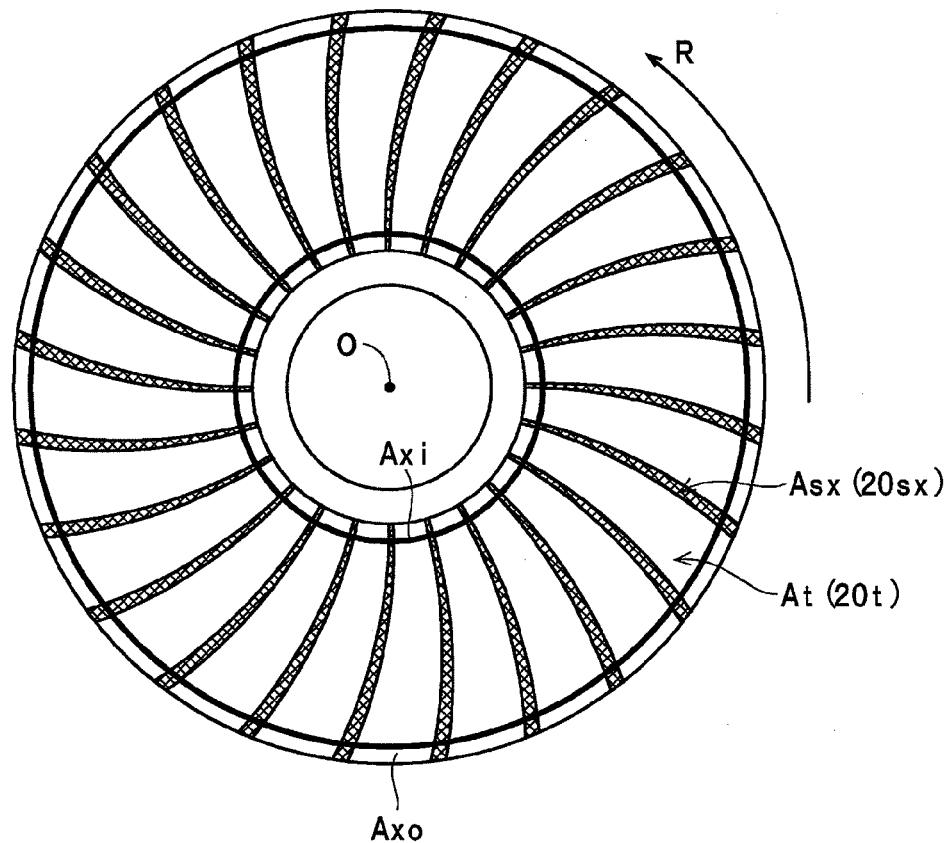
Figure 2:
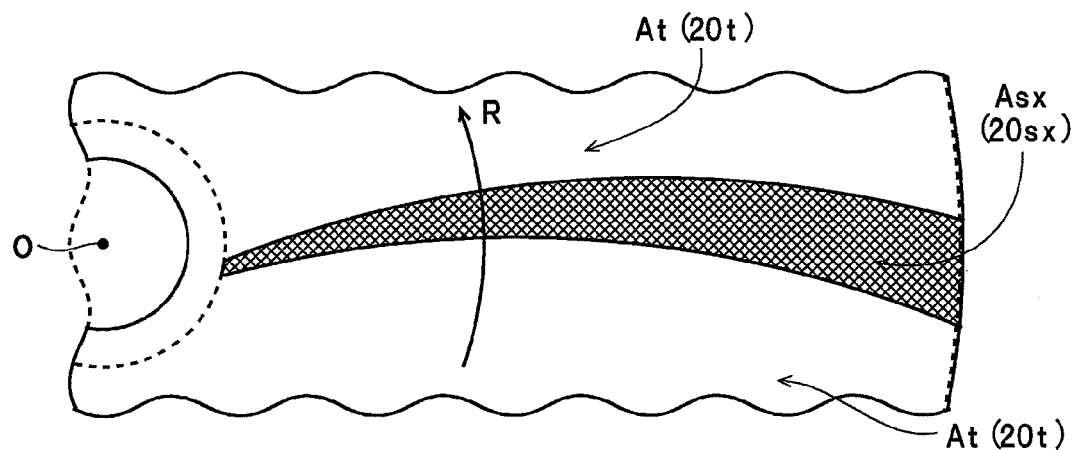
Figure 24:
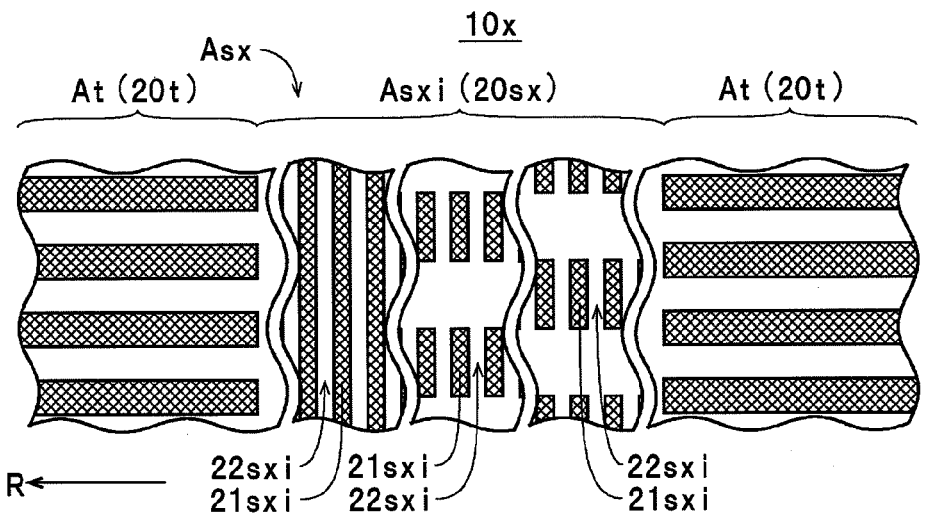
FIG. 24 is a plan view of an inner-periphery servo pattern region on the magnetic disk shown in FIG. 22.
Figure 25:
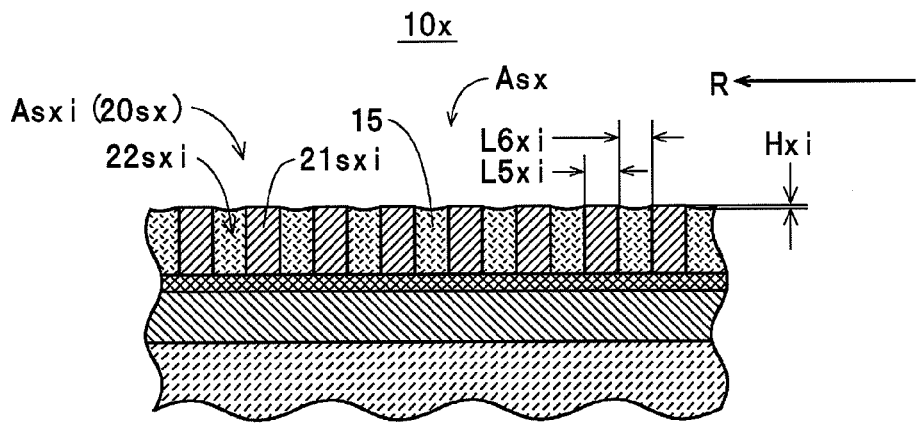
FIG. 25 is a cross-sectional view of the inner-periphery servo pattern region shown in FIG. 24.
Figure 26:
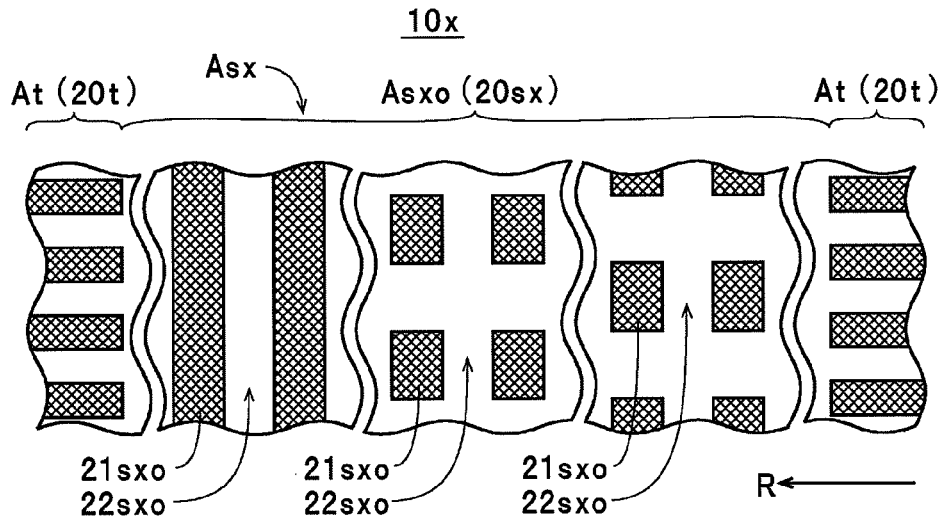
FIG. 26 is a plan view of an outer-periphery servo pattern region on the magnetic disk shown in FIG. 22.
Figure 27:
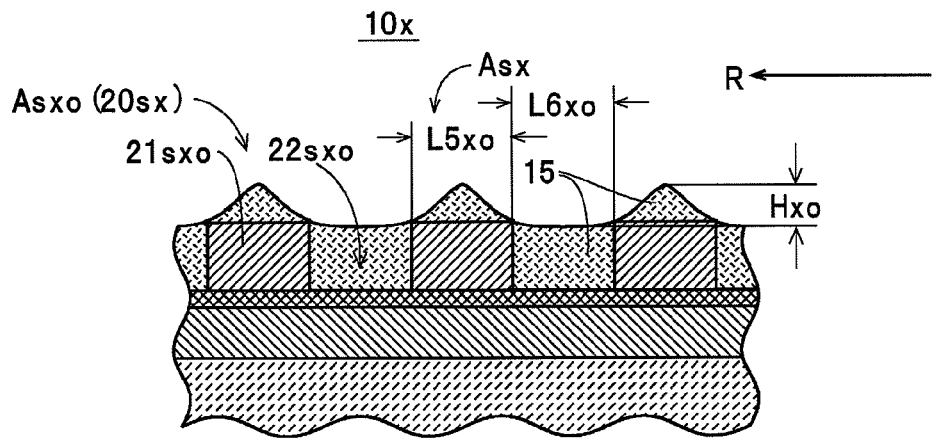
FIG. 27 is a cross-sectional view of the outer-periphery servo pattern region shown in FIG. 26.
Figure 28:
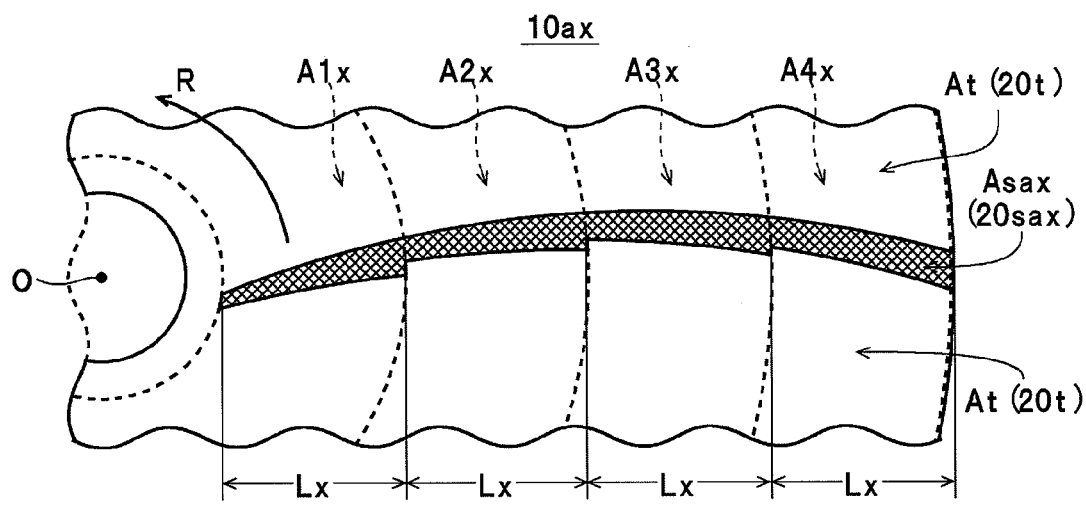
FIG. 28 is a plan view of servo pattern regions on another magnetic disk developed by the present applicant.
Figure 29:
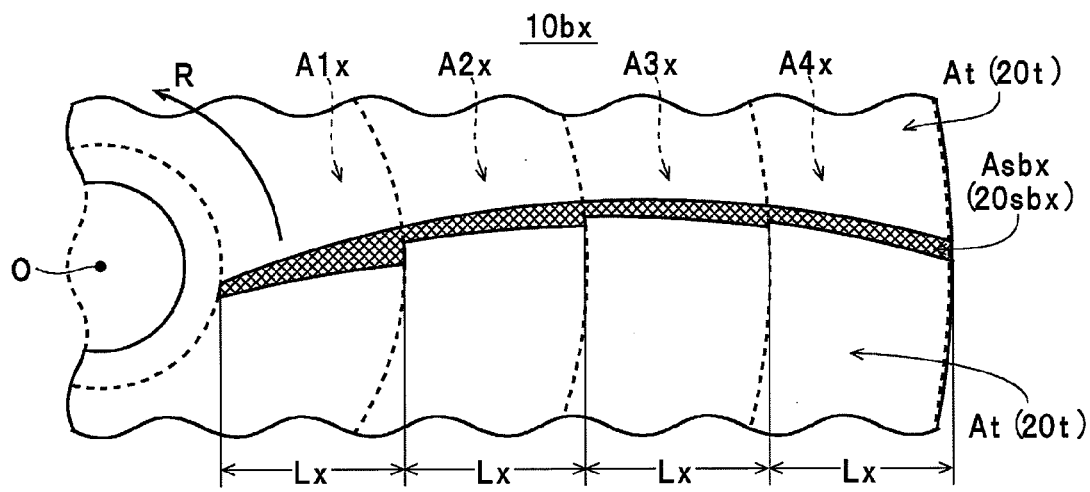
FIG. 29 is a plan view of servo pattern regions on another magnetic disk developed by the present applicant.

In addition, in the same way as the magnetic disk 10d shown in FIG. 21, it is possible to construct the concave/convex patterns 20b from a continuous magnetic layer 14b that constructs the respective convexes 21b and bottom surfaces of the concaves 22b between the respective convexes 21b. Also, the servo patterns for the present invention are not limited to the example described above and it is also possible to form the servo patterns by reversing the concave/convex form of the concave/convex patterns 20s in the servo pattern regions As of the magnetic disks 10, 10a, 10b and setting the unit convex length and the unit concave length so as to satisfy the various conditions for the present invention. Note that although a state where the surfaces of the magnetic disks 10c and 10d are smooth (i.e., where no concaves and convexes are present) are shown in FIGS. 20 and 21 for ease of understanding the multilayer construction of such magnetic disks 10c and 10d, in reality, there are cases where extremely small concaves and convexes produced during manufacturing are present.

In addition, although magnetic disks 10, 10a to 10d with concave/convex patterns 20, 20a, 20b in which the convexes 21, 21a, 21b, at least protruding end parts of which are formed of magnetic material (recording material), and the concaves 22, 22a, 22b, which are filled with the non-magnetic material 15 (non-recording material), are formed have been described, the construction of the information recording medium according to the present invention is not limited to such. More specifically, it is also possible to construct a magnetic disk with concave/convex patterns (not shown) constructed of convexes formed of a non-recording material (non-magnetic material) and concaves filled with recording material (magnetic material). Even when this construction is used, by setting the ring-shaped regions A1 to A4 in accordance with the conditions of the information recording medium according to the present invention and setting the unit convex length and the unit concave length in each ring-shaped region A in accordance with the conditions of the information recording medium according to the present invention, it is possible to achieve the same effects as the magnetic disks 10, 10a to 10d described above. Also, although the magnetic disks 10, 10a to 10d are magnetic disks for perpendicular recording, it is also possible to apply the present invention to a magnetic disk for longitudinal recording.

Figure 11:
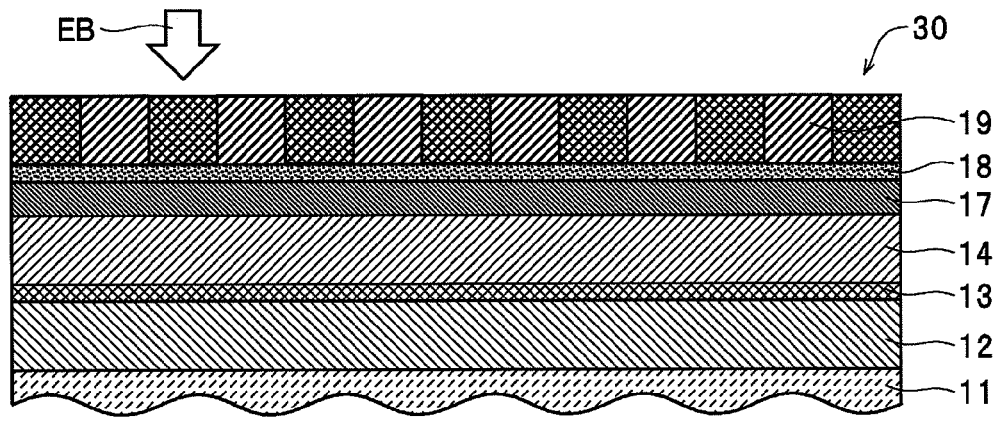
FIG. 11 is a cross-sectional view of the preform in a state where an exposure pattern is drawn on a resin layer by irradiation with an electron beam.

Also, although a method of manufacturing the magnetic disk 10 by forming the concave/convex patterns 41 in the resin layer 19 of the preform 30 by imprinting using the stamper 35 has been described, the method of manufacturing an information recording medium according to the present invention is not limited to this. More specifically, as one example, it is also possible to use a method that manufactures a magnetic disk by irradiating the resin layer 19 of the preform 30 with an electron beam EB using an electron beam drawing apparatus to draw an exposure pattern with the same planar shape as the concave/convex patterns 20s and 20t in the resin layer 19 as shown in FIG. 11 and then developing the resin layer 19 after drawing of the exposure pattern is completed to form the concave/convex patterns 41 (resist pattern) on the Si mask layer 18 as shown in FIG. 12.

What is claimed is:

1. An information recording medium where data track patterns and servo patterns are formed on at least one surface of a substrate by concave/convex patterns with plural convexes, at least protruding end parts of which are formed of one of a recording material and a non-recording material, and concaves, which are filled with another of the recording material and the non-recording material,
   wherein the concave/convex patterns that construct the data track patterns are formed so that the convexes and the concaves are disposed in one of concentric circles and a spiral,
   the concave/convex patterns that construct the data track patterns and the servo patterns are divided into plural ring-shaped regions that are concentric with the data track patterns,
   in the concave/convex patterns that construct the servo patterns, unit convex lengths and unit concave lengths are set in each ring-shaped region so that a unit convex length along a direction of rotation of the substrate and a unit concave length along the direction of rotation become longer in each ring-shaped region from an inner periphery of the ring-shaped region to an outer periphery of the ring-shaped region in proportion to a distance from a center of the data track patterns and so that a value produced by dividing an average of the unit convex length inside each ring-shaped region by a distance from the center of the data track patterns to the ring-shaped region and a value produced by dividing an average of the unit concave length inside each ring-shaped region by a distance from the center of the data track patterns to the ring-shaped region decrease from an inner-periphery ring-shaped region to an outer-periphery ring-shaped region,
   the plural ring-shaped regions are composed of an innermost ring-shaped region, an outermost ring-shaped region, and plural first ring-shaped regions between the innermost ring-shaped region and the outermost ring-shaped region, and
   respective lengths along a radial direction of the substrate of the first ring-shaped regions are set so as to increase from an inner-periphery first ring-shaped region toward an outer-periphery first ring-shaped region.

2. The information recording medium according to claim 1,
   wherein the unit convex lengths are set so that a ratio of the unit convex length in an outermost periphery of the first ring-shaped region to the unit convex length in an innermost periphery of the first ring-shaped region is equal in every first ring-shaped region, and the unit concave lengths are set so that a ratio of the unit concave length in the outermost periphery of the first ring-shaped region to the unit concave length in the innermost periphery of the first ring-shaped region is equal in every first ring-shaped region.

3. The information recording medium according to claim 1,
   wherein the unit convex lengths are set so that the unit convex length in an outermost periphery of the first ring-shaped region is equal in every first ring-shaped region, and the unit concave lengths are set so that the unit concave length in an outermost periphery of the first ring-shaped region is equal in every first ring-shaped region.

4. The information recording medium according to claim 1,
   wherein the unit convex lengths are set so that the unit convex length in an innermost periphery of the first ring-shaped region is equal in every first ring-shaped region, and the unit concave lengths are set so that the unit concave length in an innermost periphery of the first ring-shaped region is equal in every first ring-shaped region.

5. A recording/reproducing apparatus comprising:
   the information recording medium according to claim 1; and
   a control unit that carries out servo control based on servo data associated with the servo patterns.

6. A stamper for manufacturing an information recording medium, on which is formed concave/convex patterns including convexes formed corresponding to concaves in the concave/convex patterns of the information recording medium according to claim 1 and concaves formed corresponding to convexes in the concave/convex patterns of the information recording medium.

7. An information recording medium where data track patterns and servo patterns are formed on at least one surface of a substrate by concave/convex patterns with plural convexes, at least protruding end parts of which are formed of one of a recording material and a non-recording material, and concaves, which are filled with another of the recording material and the non-recording material,
   wherein the concave/convex patterns that construct the data track patterns are formed so that the convexes and the concaves are disposed in one of concentric circles and a spiral,
   the concave/convex patterns that construct the data track patterns and the servo patterns are divided into plural ring-shaped regions that are concentric with the data track patterns,
   in the concave/convex patterns that construct the servo patterns, unit convex lengths and unit concave lengths are set in each ring-shaped region so that a unit convex length along a direction of rotation of the substrate and a unit concave length along the direction of rotation become longer in each ring-shaped region from an inner periphery of the ring-shaped region to an outer periphery of the ring-shaped region in proportion to a distance from a center of the data track patterns and so that a value produced by dividing an average of the unit convex length inside each ring-shaped region by a distance from the center of the data track patterns to the ring-shaped region and a value produced by dividing an average of the unit concave length inside each ring-shaped region by a distance from the center of the data track patterns to the ring-shaped region decrease from an inner-periphery ring-shaped region to an outer-periphery ring-shaped region,
   the plural ring-shaped regions are composed of plural first ring-shaped regions and at least one second ring-shaped region,
   respective lengths along a radial direction of the substrate of the first ring-shaped regions are set so as to increase from an inner-periphery first ring-shaped region toward an outer-periphery first ring-shaped region, and
   in the at least one second ring-shaped region, unit convex lengths are set so that an innermost unit convex length in the at least one second ring-shaped region is no shorter than a shortest length out of innermost unit convex lengths in the respective first ring-shaped regions and an outermost unit convex length in the at least one second ring-shaped region is no greater than a longest length out of outermost unit convex lengths in the respective first ring-shaped regions, and unit concave lengths are set so that an innermost unit concave length in the at least one second ring-shaped region is no shorter than a shortest length out of innermost unit concave lengths in the respective first ring-shaped regions and an outermost unit concave length in the at least one second ring-shaped region is no greater than a longest length out of outermost unit concave lengths in the respective first ring-shaped regions.

8. The information recording medium according to claim 2,
wherein the unit convex lengths are set so that a ratio of the unit convex length in an outermost periphery of the first ring-shaped region to the unit convex length in an innermost periphery of the first ring-shaped region is equal in every first ring-shaped region, and the unit concave lengths are set so that a ratio of the unit concave length in the outermost periphery of the first ring-shaped region to the unit concave length in the innermost periphery of the first ring-shaped region is equal in every first ring-shaped region.

9. The information recording medium according to claim 7,
wherein the unit convex lengths are set so that the unit convex length in an outermost periphery of the first ring-shaped region is equal in every first ring-shaped region, and the unit concave lengths are set so that the unit concave length in an outermost periphery of the first ring-shaped region is equal in every first ring-shaped region.

10. The information recording medium according to claim 7,
wherein the unit convex lengths are set so that the unit convex length in an innermost periphery of the first ring-shaped region is equal in every first ring-shaped region, and the unit concave lengths are set so that the unit concave length in an innermost periphery of the first ring-shaped region is equal in every first ring-shaped region.

11. A recording/reproducing apparatus comprising:
the information recording medium according to claim 7; and
a control unit that carries out servo control based on servo data associated with the servo patterns.

12. A stamper for manufacturing an information recording medium, on which is formed concave/convex patterns including convexes formed corresponding to concaves in the concave/convex patterns of the information recording medium according to claim 7 and concaves formed corresponding to convexes in the concave/convex patterns of the information recording medium.

* * * * *